United States Patent
Takeguchi et al.

(10) Patent No.: US 8,546,038 B2
(45) Date of Patent: *Oct. 1, 2013

(54) FUEL CELL SEPARATOR HAVING REACTANT GAS CHANNELS WITH DIFFERENT CROSS SECTIONS AND FUEL CELL COMPRISING THE SAME

(75) Inventors: Shinsuke Takeguchi, Osaka (JP); Yoichiro Tsuji, Osaka (JP); Takashi Nakagawa, Osaka (JP)

(73) Assignee: Panasonic Corporation, Osaka (JP)

( * ) Notice: Subject to any disclaimer, the term of this patent is extended or adjusted under 35 U.S.C. 154(b) by 346 days.

This patent is subject to a terminal disclaimer.

(21) Appl. No.: 12/988,611

(22) PCT Filed: May 18, 2009

(86) PCT No.: PCT/JP2009/002172
§ 371 (c)(1),
(2), (4) Date: Oct. 19, 2010

(87) PCT Pub. No.: WO2009/141989
PCT Pub. Date: Nov. 26, 2009

(65) Prior Publication Data
US 2011/0033775 A1    Feb. 10, 2011

(30) Foreign Application Priority Data
May 19, 2008   (JP) ................. 2008-131165
May 19, 2008   (JP) ................. 2008-131166

(51) Int. Cl.
*H01M 2/38*    (2006.01)

(52) U.S. Cl.
USPC ................. 429/457; 429/512; 429/514

(58) Field of Classification Search
USPC .......................... 429/457, 512, 514
See application file for complete search history.

(56) References Cited

U.S. PATENT DOCUMENTS

| 6,500,579 B1 | 12/2002 | Maeda et al. |
| 7,067,213 B2 | 6/2006 | Boff et al. |
| 2005/0244699 A1 | 11/2005 | Shimoi et al. |
| 2009/0029228 A1 | 1/2009 | Shibata et al. |
| 2009/0162717 A1* | 6/2009 | Nakagawa et al. ............ 429/30 |

FOREIGN PATENT DOCUMENTS

| JP | 10-284094 | 10/1998 |
| JP | 10284094 A  * | 10/1998 |
| JP | 2001-076746 | 3/2001 |

(Continued)

*Primary Examiner* — Zachary Best
(74) *Attorney, Agent, or Firm* — McDermott Will & Emery LLP

(57) ABSTRACT

A fuel cell separator of the present invention is a plate-shaped fuel cell separator including a reaction gas supply manifold hole (21), a reactant gas discharge manifold hole (22), a groove-shaped first reactant gas channel (131), and one or more groove-shaped second reaction gas channels (132, 133), wherein the first reactant gas channel (131) includes a first portion (41) and a second portion (51) located upstream of the first portion (41), and a cross-sectional area of a continuous portion extending from the upstream end of the first reactant gas channel (131) and/or a cross-sectional area of at least a portion of the first reactant gas channel (131) which lies downstream of the first portion (41) is/are smaller than cross-sectional areas of the second reactant gas channels (132, 133).

14 Claims, 21 Drawing Sheets

(56) References Cited

FOREIGN PATENT DOCUMENTS

| | | |
|---|---|---|
| JP | 2004-520692 | 7/2004 |
| JP | 2004-235063 | 8/2004 |
| JP | 2005-276736 | 10/2005 |
| JP | 2007-227398 | 9/2007 |
| WO | WO 02/065566 A1 | 8/2002 |
| WO | WO 2007/088832 A1 | 8/2007 |
| WO | WO 2007148761 A1 * | 12/2007 |

* cited by examiner

| | MEMBRANE RESISTANCE (mΩ) |
|---|---|
| EXAMPLE 3 | 1.941 |
| EXAMPLE 4 | 1.969 |
| COMPARATIVE EXAMPLE | 1.984 |

FUEL CELL SEPARATOR HAVING REACTANT GAS CHANNELS WITH DIFFERENT CROSS SECTIONS AND FUEL CELL COMPRISING THE SAME

RELATED APPLICATIONS

This application is the U.S. National Phase under 35 U.S.C. §371 of International Application No. PCT/JP2009/002172, filed on May 18, 2009, which in turn claims the benefit of Japanese Application Nos. 2008-131165, filed on May 19, 2008 and 2008-131166, filed on May 19, 2008, the disclosures of which Applications are incorporated by reference herein.

TECHNICAL FIELD

The present invention relates to a fuel cell separator and a fuel cell including the fuel cell separator. Particularly, the present invention relates to a structure of a fuel cell separator.

BACKGROUND ART

Polymer electrolyte fuel cells (hereinafter referred to as PEFCs) are configured to generate electric power and heat simultaneously through an electrochemical reaction between a fuel gas containing hydrogen and an oxidizing gas containing oxygen, such as air. A cell of a PEFC includes a MEA (Membrane-Electrode-Assembly) composed of a polymer electrode membrane and a pair of gas diffusion electrodes (anode and cathode), gaskets and electrically-conductive plate-shaped separators. The PEFC is typically formed in such a manner that plural cells are stacked together, both ends of the cells stacked together are sandwiched between end plates, and the end plates and the cells are fastened together by fastener members.

Each separator is provided on a main surface thereof manifold holes (reactant gas supply manifold hole and reactant gas discharge manifold hole) forming manifolds used to supply and discharge a fuel gas or an oxidizing gas (theses are referred to as reactant gases), and is provided on a main surface thereof contacting the gas diffusion electrode with groove-shaped reactant gas channels through which the reactant gas flows such that the reactant gas channels are connected to the manifold holes.

While flowing through the reactant gas channels, the reactant gas is supplied to the MEA and consumed through an electrochemical reaction inside the MEA. For this reason, in downstream regions of the reactant gas channels, a hydrogen concentration or an oxygen concentration decreases because of the consumption of the gas. As a result, in downstream regions of the reactant gas channels where the gas concentration is low, a power generation amount decreases and a power generation distribution according to the gas concentration is formed within a cell surface.

To solve such a problem, a fuel cell directed to increasing a power generation efficiency by making a gas concentration uniform within a cell surface by devising a shape of the gas channels is known (see, e.g., Patent literature 1). FIG. 9 is a schematic view showing a configuration of a main surface of a separator of the fuel cell disclosed in Patent literature 1.

As shown in FIG. 9, in a separator 200 in the fuel cell disclosed in Patent literature 1, a plurality of (three in FIG. 9) fluid channels 201~203 (reactant gas channels) are composed of upstream portions of a substantially L-shape having upstream ends connected to an inlet (reactant gas supply manifold hole) 211, downstream portions having downstream ends connected to an outlet (reactant gas discharge manifold hole) 212, and midstream portions connecting downstream ends of the upstream portions to upstream ends of the downstream portions, and entirely have a spiral shape. In this structure, the upstream portions or the downstream portions of the fluid channels are not focused on specific regions of the separator 200, thereby making the reactant gas concentration uniform within an electrode surface.

CITATION LIST

Patent Literature
  Patent literature 1: Japanese Laid-Open Patent Application Publication No. Hei. 10-284094

SUMMARY OF INVENTION

Technical Problem

However, the inventors discovered that there is a room for improvement in the separator 200 disclosed in Patent literature 1, to improve a utilization efficiency of the reactant gas flowing through the plurality of fluid channels.

The present invention is made to solve the above mentioned problem, and an object of the present invention is to provide a fuel cell separator and a fuel cell which can improve a utilization efficiency of a reactant gas flowing through reactant gas channels.

Solution to Problem

The inventors studied intensively to solve the problem associated with the prior art and found the following.

To be specific, in the separator 200 of the fuel cell disclosed in Patent literature 1, a part of the reactant gas flowing through regions of the upstream portions of the fluid channels 201~203, which regions are in the vicinity of the upstream ends of the fluid channels 201~203 shortcuts to regions of the downstream portions of the fluid channels 201~202, which regions are in the vicinity of the upstream ends and are in close proximity to the regions of the upstream portions, and thereby, a part of the reactant gas flowing through the fluid channels 201~203 is not consumed in the reaction but discharged, which reduces the utilization efficiency of the reactant gas.

To be specific, the fluid channels 201~203 are provided adjacently to a gas diffusion layer of a gas diffusion electrode (open surface (upper surface) of the separator 200 is covered with the gas diffusion layer), and therefore a part of the reactant gas flowing through the fluid channels 201~203 flows through the gas diffusion layer (hereinafter a gas flowing through the gas diffusion layer is referred to as a underflow gas). For this reason, a pressure difference is generated between the reactant gas flowing through the upstream portion of the fluid channel 201 located at lowermost side among the three fluid channels 201~203, and the reactant gas flowing through a region 204 of the downstream portion of the fluid channel 201, which region is located closest to the upstream end thereof, thereby causing a part of the reactant gas flowing through the upstream portion of the fluid channel 201 to flow into (shortcuts to) the downstream portion of the fluid channel 201 via the gas diffusion layer. The reactant gas which has flowed into the downstream portion of the fluid channel 201 flows through the downstream portion and is discharged from the outlet 212. As a result, a part of the reactant gas flowing through the fluid channel 201 is not consumed in the reaction but discharged, which reduces the utilization efficiency of the reactant gas.

In addition, since the reactant gas flowing through the upstream portion of the fluid channel 201 located at lowermost side, among the three fluid channels 201~203, shortcuts, a pressure difference is generated between the reactant gas flowing through the upstream portions of the remaining two fluid channels 202 and 203, and the reactant gas flowing through the upstream portion of the fluid channel 201. Because of this pressure difference, a part of the reactant gas flowing through the upstream portions of the remaining two fluid channels 202 and 203, flows into the upstream portion of the fluid channel 201. A part of the reactant gas which has flowed into the upstream portion of the fluid channel 201, shortcuts to the downstream portion of the fluid channel 201. This further increases the amount of the reactant gas which will be discharged without being consumed in the reaction, in the reactant gas flowing through the fluid channels 201~203, and further reduces the utilization efficiency of the reactant gas.

To solve the above mentioned problem, the inventors discovered that the object of the present invention is achieved effectively by using the configuration described below.

To be specific, a fuel cell separator of the present invention, comprises: a reactant gas supply manifold hole penetrating the separator in a thickness direction thereof; a reactant gas discharge manifold hole penetrating the separator in the thickness direction thereof; a groove-shaped first reactant gas channel provided on at least one main surface thereof such that the first reactant gas channel is bent, an upstream end of the first reactant gas channel is connected to the reactant gas supply manifold hole, and a downstream end of the first reactant gas channel is connected to the reactant gas discharge manifold hole; and one or more groove-shaped second reactant gas channels provided on at least one main surface thereof such that the second reactant gas channels are bent, at least upstream ends of the second reactant gas channels are connected to the reactant gas supply manifold hole, and the second reactant gas channels run along the first reactant gas channel; wherein the first reactant gas channel includes a first portion and a second portion located upstream of the first portion, the first portion is located closest to the upstream end, in a portion of the first reactant gas channel which lies between the downstream end and the second portion, and the second portion is located closest to the downstream end, in a portion of the first reactant gas channel which lies between the first portion and the upstream end; wherein the second reactant gas channel does not exist between the first portion and the upstream end, but exists between the downstream end and the second portion; and wherein a cross-sectional area of at least a continuous portion (hereinafter referred to as a first specified portion) of the first reactant gas channel, the continuous portion extending from the upstream end and/or a cross-sectional area of at least a portion (hereinafter referred to as a second specified portion) of the first reactant gas channel, the portion being located downstream of the first portion is/are smaller than a cross-sectional area of at least one second reactant gas channel (hereinafter referred to as specified second reactant gas channel) of the one or more second reactant gas channels.

In accordance with such a configuration, since the flow rate of the reactant gas flowing through the first specified portion of the first reactant gas channel is lessened, the amount of the reactant gas which shortcuts from the upstream portion to the downstream portion in the first reactant gas channel is lessened. Even if the reactant gas shortcuts from the upstream portion to the downstream portion (especially first portion) in the first reactant gas channel, a pressure loss of the second specified portion of the first reactant gas channel increases instantaneously, because of the smaller cross-sectional area of the second specified portion. For this reason, a pressure difference generated between the oxidizing gas flowing through the upstream portion of the first oxidizing gas channel and the oxidizing gas flowing through the second specified portion is lessened, thereby reducing the amount of oxidizing gas which shortcuts from the upstream portion to the downstream portion. Therefore, it is possible to reduce the amount of the reactant gas which will be discharged without being consumed in the reaction, in the reactant gas flowing through the first reactant gas channel. As a result, a utilization efficiency of the reactant gas can be improved.

In the fuel cell separator of the present invention, width(s) of channel portion(s) of the first specified portion and/or the second specified portion of the first reactant gas channel may be smaller than a width of the specified second reactant gas channel.

In the fuel cell separator of the present invention, depth(s) of channel portion(s) of the first specified portion and/or the second specified portion of the first reactant gas channel may be smaller than a depth of the specified second reactant gas channel.

In the fuel cell separator of the present invention, a cross-sectional area of a channel portion of the first specified portion of the first reactant gas channel may be smaller than a cross-sectional area of a channel portion of a portion of the first reactant gas channel which is other than the first specified portion.

In the fuel cell separator of the present invention, a width of the channel portion of the first specified portion of the first reactant gas channel may be smaller than a width of the channel portion of the portion of the first reactant gas channel which is other than the first specified portion.

In the fuel cell separator of the present invention, a depth of the channel portion of the first specified portion of the first reactant gas channel may be smaller than a depth of the channel portion of the portion of the first reactant gas channel which is other than the first specified portion.

In the fuel cell separator of the present invention, a cross-sectional area of a channel portion of the second specified portion of the first reactant gas channel may be smaller than a cross-sectional area of a channel portion of a portion of the first reactant gas channel which is other than the second specified portion.

In the fuel cell separator of the present invention, a width of the channel portion of the second specified portion of the first reactant gas channel may be smaller than a width of the channel portion of the portion of the first reactant gas channel which is other than the second specified portion.

In the fuel cell separator of the present invention, a depth of the channel portion of the second specified portion of the first reactant gas channel may be smaller than a depth of the channel portion of the portion of the first reactant gas channel which is other than the second specified portion.

In the fuel cell separator of the present invention, the first reactant gas channel may be connected to at least a second reactant gas channel of the one or more second reactant gas channels, which is located closest to the first reactant gas channel such that the first reactant gas channel is connected to at least the second reactant gas channel in a location downstream of the first specified portion.

In the fuel cell separator of the present invention, the first reactant gas channel may be connected to at least a second reactant gas channel of the one or more second reactant gas channels, which is located closest to the first reactant gas channel such that the first reactant gas channel is connected to at least the second reactant gas channel in a location upstream of the second specified portion.

In the fuel cell separator of the present invention, a portion of the first reactant gas channel which lies between the second portion and the first portion may have a spiral shape.

In the fuel cell separator of the present invention, a portion of the first reactant gas channel which lies between the second portion and the first portion may have a serpentine shape.

A fuel cell of the present invention comprises a pair of fuel cell separators including the fuel cell separator as recited above and a membrane-electrode assembly including an electrolyte layer and a pair of electrodes sandwiching the electrolyte layer; the membrane-electrode assembly being sandwiched between the pair of fuel cell separators.

In accordance with such a configuration, since the flow rate of the reactant gas flowing through the first specified portion of the first reactant gas channel is lessened, the amount of the reactant gas which shortcuts from the upstream portion to the downstream portion in the first reactant gas channel is lessened. Even if the reactant gas shortcuts from the upstream portion to the downstream portion (especially first portion) in the first reactant gas channel, a pressure loss of the second specified portion of the first reactant gas channel increases instantaneously, because of the smaller cross-sectional area of the second specified portion. For this reason, a pressure difference generated between the oxidizing gas flowing through the upstream portion of the first oxidizing gas channel and the oxidizing gas flowing through the second specified portion is lessened, thereby reducing the amount of oxidizing gas which shortcuts from the upstream portion to the downstream portion. Therefore, it is possible to reduce the amount of the reactant gas which will be discharged without being consumed in the reaction, in the reactant gas flowing through the first reactant gas channel. As a result, a utilization efficiency of the reactant gas can be improved.

The above and further objects, features and advantages of the present invention will more fully be apparent from the following detailed description of preferred embodiments with reference to accompanying drawings.

Advantageous Effects of Invention

In accordance with the fuel cell separator and fuel cell of the present invention, since the amount of the reactant gas which shortcuts from the upstream portion to the downstream portion in the first reactant gas channel can be reduced, the amount of reactant gas which will be discharged without being consumed in the reaction can be reduced, thereby improving a utilization efficiency of the reactant gas.

DESCRIPTION OF EMBODIMENTS

Figure 1:
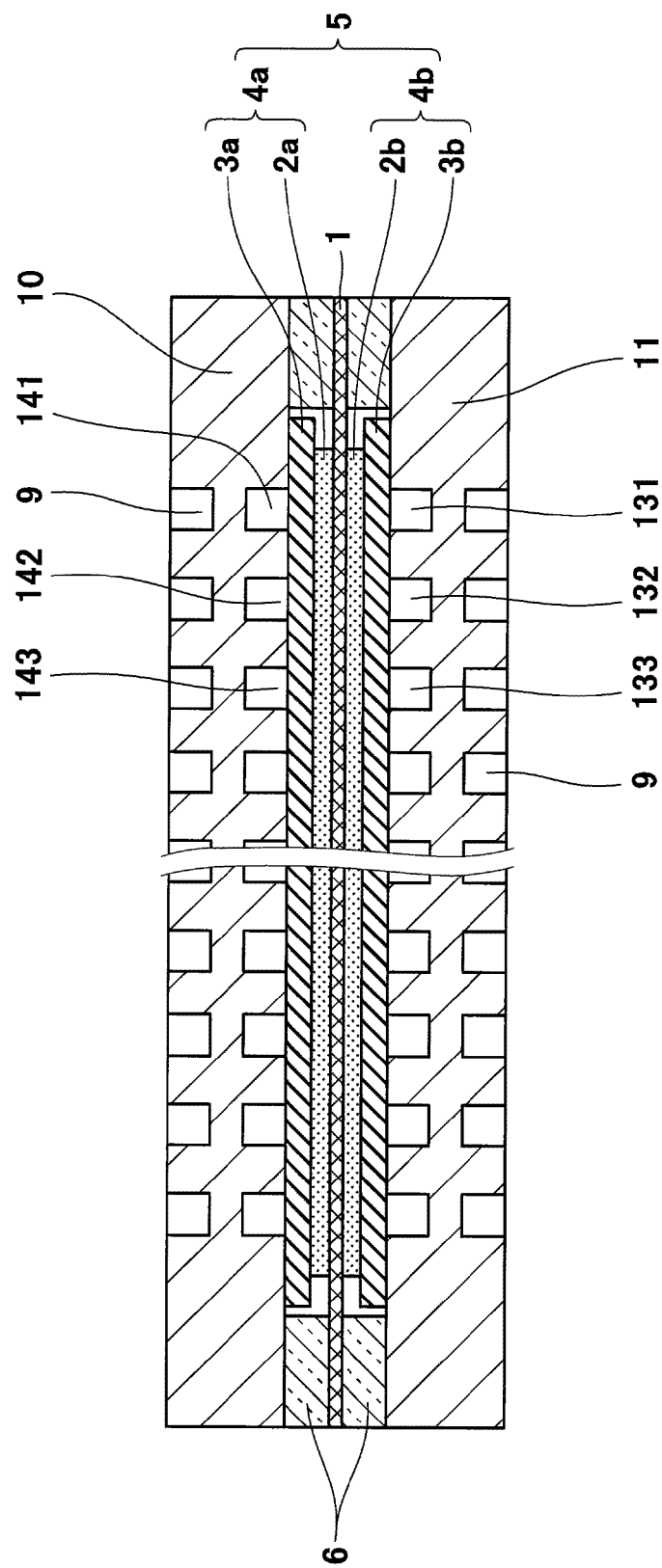
FIG. 1 is a cross-sectional view schematically showing a configuration of a fuel cell according to Embodiment 1 of the present invention.

Hereinafter, preferred embodiments of the present invention will be described with reference to the drawings. Throughout the drawings, the same or corresponding parts are designated by the same reference numerals and repetitive description thereof is sometimes omitted. In FIGS. 2 to 8 and FIGS. 12 to 20, the upper and lower sides of the separator are upper and lower sides in these drawings.

(Embodiment 1)

[Configuration of Fuel Cell]

FIG. 1 is a cross-sectional view schematically showing a configuration of a fuel cell according to Embodiment 1 of the present invention. In FIG. 1, a part of the configuration is omitted.

As shown in FIG. 1, a fuel cell 100 of Embodiment 1 is a cell and includes a MEA (Membrane-Electrode-Assembly) 5, gaskets 6 and an anode separator 10, and a cathode separator 11.

The MEA 5 has a polymer electrolyte membrane (electrolyte layer: e.g., Nafion (trade name) manufactured by Dupont US Co., Ltd) which selectively transports hydrogen ions, an anode 4a and a cathode 4b.

The polymer electrolyte membrane 1 has a substantially quadrilateral shape (in this embodiment rectangular shape). The anode 4a and the cathode 4b (these are referred to as gas diffusion electrodes) are provided on both surfaces of the polymer electrolyte membrane 1 such that they are respectively positioned inward relative to peripheral portions thereof. The manifold holes such as reactant gas supply manifold hole as described later are provided to penetrate the peripheral portion of the polymer electrolyte membrane 1 in a thickness direction thereof (not shown).

The anode 4a includes an anode catalyst layer 2a which is provided on one main surface of the polymer electrolyte membrane 1 and is composed of a mixture of electrically conductive carbon particles carrying electrocatalyst (e.g., precious metal such as platinum) and polymer electrolyte having hydrogen ion conductivity, and an anode gas diffusion layer 3a which is provided on a main surface of the anode catalyst layer 2a and has gas permeability and electrical conductivity. Likewise, the cathode 4b includes a cathode catalyst layer 2b which is provided on the other main surface of the polymer electrolyte membrane 1 and is composed of a mixture of electrically conductive carbon particles carrying electrocatalyst (e.g., precious metal such as platinum) and polymer electrolyte having hydrogen ion conductivity, and a cathode gas diffusion layer 3b which is provided on a main surface of the cathode catalyst layer 2b and has gas permeability and electrical conductivity.

The anode catalyst layer 2a and the cathode catalyst layer 2b can be each produced by a method known in the art using a catalyst layer forming ink containing electrically conductive carbon particles carrying electrocatalyst made of precious metal, a polymer electrolyte, and a dispersing medium. A material forming the anode gas diffusion layer 3a and the cathode gas diffusion layer 3b is not particularly limited, but may be those known in the art. For example, an electrically conductive porous base material such as a carbon cloth or a carbon paper may be used. The electrically conductive porous base material may be subjected to water-repellent treatment by a conventionally known method.

The pair of annular gaskets 6 which are of a substantially rectangular shape and are made of fluorocarbon rubber are provided around the anode 4a and the cathode 4b of the MEA 5 such that the gaskets 6 sandwich the polymer electrolyte membrane 1. This prevents the fuel gas, the air and the oxidizing gas from leaking to outside the cell and prevents these gases from being mixed inside the fuel cell 100. Manifold holes such as a reactant gas supply manifold hole described later are formed to penetrate the peripheral portions of the gaskets 6 in the thickness direction thereof The electrically-conductive plate-shaped anode separator (fuel cell separator) 10 and the electrically-conductive plate-shaped cathode separator (fuel cell separator) 11 are provided to sandwich the MEA 5 and the gaskets 6. Thus, the MEA 5 is mechanically fastened and electric connection of the MEA 5 is formed in a state where a plurality of fuel cells 100 are stacked together in the thickness direction thereof. The separators 10 and 11 may be formed of a metal which is high in heat conductivity and electric conductivity, graphite or a mixture of graphite and resin. For example, a mixture of carbon powders and a binder (solvent) which is fabricated by injection molding or a plate material which is made of titanium or stainless steel and has a gold-plated surface may be used.

A groove-shaped first fuel gas channel (first reactant gas channel) 141 and groove-shaped second fuel gas channels (second reactant gas channels) 142 and 143 are provided on one main surface of the anode separator 10 which is in contact with the anode 4a to flow the fuel gas therethrough such that the second fuel gas channels 142 and 143 run along the first fuel gas channel 141, while groove-shaped cooling medium channel(s) 9 is/are provided on the other main surface of the anode separator 10 to flow a cooling medium therethrough. Likewise, a groove-shaped first oxidizing gas channel (first reactant gas channel) 131 and groove-shaped second oxidizing gas channels (second reactant gas channels) 132 and 133 are provided on one main surface of the cathode separator 11 which is in contact with the cathode 4b to flow the oxidizing gas therethrough such that the second oxidizing gas channels 132 and 133 run along the first oxidizing gas channel 131, while groove-shaped cooling medium channel(s) 9 is/are provided on the other main surface of the cathode separator 10 to flow a cooling medium therethrough.

In the above configuration, the fuel gas and the oxidizing gas are supplied to the anode 4a and the cathode 4b, respectively, and these gases react with each other to generate electricity and heat. A cooling medium such as cooling water is flowed through the cooling medium channel 9 to recover the generated heat.

The fuel cell 100 configured as described above may be used as a single cell, or otherwise a plurality of fuel cells 100 may be stacked together to form a cell stack. When the fuel cells 100 are stacked together, the cooling medium channel(s) 9 may be provided for each set of two or three cells. When the cooling medium channel(s) 9 is/are not provided between the cells, a single separator sandwiched between two MEAS 5 may be provided with the first fuel gas channel 141 and the second fuel gas channels 142 and 143 on one main surface thereof and the first oxidizing gas channel 131 and the second oxidizing gas channels 131 and 132 on the other main surface thereof so that the single separator can serve as both of the anode separator 10 and the cathode separator 11.

Next, the cathode separator 11 will be described in detail with reference to FIGS. 1 and 2. Since the anode separator 10 is identical in basic configuration to the cathode separator 11, it will not be described in detail.

[Configuration of Fuel Cell Separator]

Figure 2:
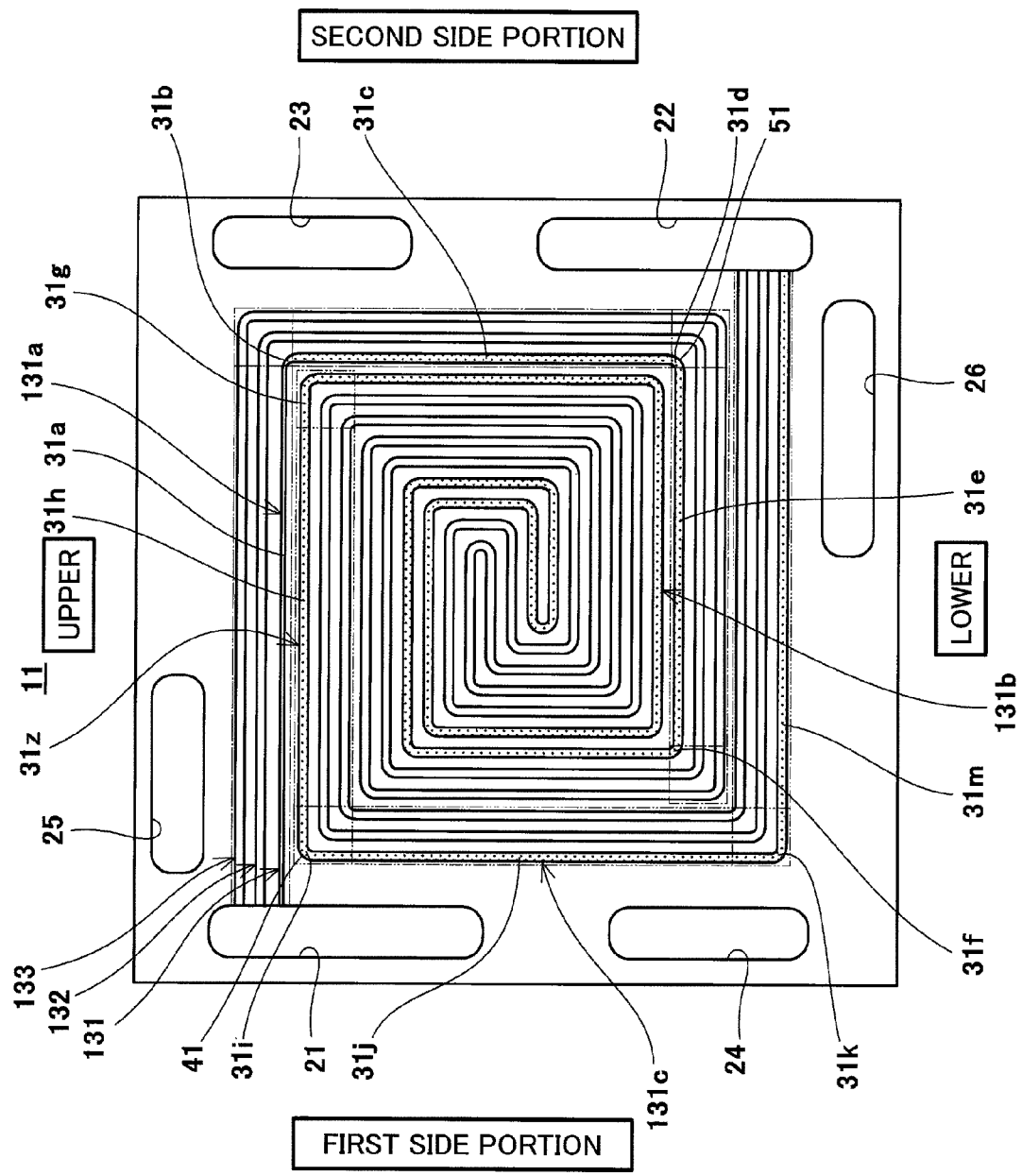
FIG. 2 is a schematic view showing a configuration of a cathode separator of the fuel cell of FIG. 1.

FIG. 2 is a schematic view showing a configuration of the cathode separator (fuel cell separator according to Embodiment 1 of the present invention) 11 of the fuel cell 100 of FIG. 1.

As shown in FIG. 2, the cathode separator 11 of Embodiment 1 has a plate shape and is in the form of substantially rectangle. A plurality of through-holes are formed in the peripheral portion of the main surface of the cathode separator 11 to penetrate therethrough in the thickness direction thereof. The through-holes are an oxidizing gas supply manifold hole (reactant gas supply manifold hole) 21 used to supply the oxidizing gas, an oxidizing gas discharge manifold hole (reactant gas discharge manifold hole) 22 used to discharge the oxidizing gas, a fuel gas supply manifold hole (reactant gas supply manifold hole) 23 used to supply the fuel gas, a fuel gas discharge manifold hole (reactant gas discharge manifold hole) 24 used to discharge the fuel gas, a cooling medium supply manifold hole 25 used to supply a cooling medium, and a cooling medium discharge manifold hole 26 used to discharge the cooling medium.

The oxidizing gas supply manifold hole 21 is provided at the upper portion of one side portion (left side portion in the drawings: hereinafter referred to as first side portion) of the cathode separator 11, while the oxidizing gas discharge manifold hole 22 is provided at the lower portion of the other side portion (right side portion in the drawings: hereinafter referred to as second side portion) of the fuel cell separator. The fuel gas supply manifold hole 23 is provided at the upper portion of the second side portion, and the fuel gas discharge manifold hole 24 is provided at the lower portion of the first side portion. Furthermore, the cooling medium supply manifold hole 25 is provided above the oxidizing gas supply manifold hole 21 to be closer to the second side portion than the oxidizing gas supply manifold hole 21, while the cooling medium discharge manifold hole 26 is provided below the oxidizing gas discharge manifold hole 22 to be closer to the first side portion than the oxidizing gas discharge manifold hole 22.

The oxidizing gas supply manifold hole 21 and the oxidizing gas discharge manifold 22 are provided opposite to each other to sandwich the center portion of the cathode separator 11, while the fuel gas supply manifold hole 23 and the fuel gas discharge manifold 24 are provided opposite to each other to sandwich the center portion of the cathode separator 11. The term "center portion of the cathode separator 11" as used herein means a center portion relative to the outer periphery of the cathode separator 11.

The cathode separator 11 is provided on a main surface thereof a groove-shaped first oxidizing gas channel 131 and a plurality of (in this embodiment, two) groove-shaped second oxidizing gas channels 132 and 133 to supply the oxidizing gas to the entire region of the main surface of the cathode 4b such that the first oxidizing gas channel 131 and the second oxidizing gas channels 132 and 133 connect the oxidizing gas supply manifold hole 21 to the oxidizing gas discharge manifold hole 22. The first oxidizing gas channel 131, and the second oxidizing gas channels 132 and 133 are formed to run along one another. As used herein, the phrase "the channels run along one another" means that a plurality of oxidizing gas channels are arranged to run along one another. To be more specific, the phrase "the channels run along one another" means that, along a specified one of the plurality of oxidizing gas channels, other oxidizing gas channels run. In other words, the plurality of oxidizing gas channels are provided such that the oxidizing gas flows through the respective channels in the same direction as a whole from upstream ends thereof to downstream ends thereof. Therefore, the plurality of oxidizing gas channels need not entirely run along one another from the upstream ends to the downstream ends thereof, but may have portions which do not run along one another.

The second oxidizing gas channels 132 and 133 are configured such that the grooves forming the channels have an equal cross-sectional area (hereinafter simply referred to as channel cross-sectional area) in a direction perpendicular to the flow of the oxidizing gas. The second oxidizing gas channels 132 and 133 constitute specified second reactant gas channels, respectively (hereinafter simply referred to as second reactant gas channels 132 and 133). Since the second oxidizing gas channels 132 and 133 are configured similarly to the first oxidizing gas channel 131, the first oxidizing gas channel 131 will be explained hereinafter.

The first oxidizing gas channel 131 includes a substantially-U-shaped upstream portion 131a (channel portion within one-dotted line shown in FIG. 2) having an upstream end connected to the oxidizing gas supply manifold hole 21, a substantially-U-shaped downstream portion 131c (channel portion within two-dotted line shown in FIG. 2) having a downstream end connected to the oxidizing gas discharge manifold hole 22, and a spiral-shaped midstream portion 131b having an upstream end connected to the downstream end of the upstream portion 131a and a downstream end connected to the upstream end of the downstream portion 131c. The upstream portion 131a and the downstream portion 131c are configured to surround the midstream portion 131b.

The upstream portion 131a is a portion of the first oxidizing gas channel 131, which lies between one end which is an upstream end of the first oxidizing gas channel 131, i.e., an end connected to the oxidizing gas supply manifold hole 21, and the other end which is a portion satisfying a formula: $L1 \leq L2$. In the formula, $L1$ designates a channel length of the upstream portion 131a of the first oxidizing gas channel 131 and $L2$ designates a whole channel length of the first oxidizing gas channel 131. More preferably, the other end of the upstream portion 131a is a portion satisfying a formula :

$$L1 \leq \{(\frac{1}{3}) \times L2\}.$$

The downstream portion 131c is a portion of the first oxidizing gas channel 131, which lies between one end which is an downstream end of the first oxidizing gas channel 131, i.e., an end connected to the oxidizing gas discharge manifold hole 22 and the other end which is a portion satisfying a formula $L3 \leq L2$. In the formula, $L3$ designates a channel length of the downstream portion 131c of the first oxidizing gas channel 131. More preferably, the other end of the downstream portion 131c is a portion satisfying a formula: $L3 \leq \{(\frac{1}{3}) \times L2\}$.

The upstream portion 131a is composed of a first upstream linear portion 31a, a first upstream turn portion 31b, a second upstream linear portion 31c, a second upstream turn portion 31d, a third upstream linear portion 31e and a third upstream turn portion 31f.

The first upstream linear portion 31a is connected at its upstream end to the oxidizing gas supply manifold hole 21 and extends from the first side portion toward the second side portion of the cathode separator 11 (extend in a horizontal direction). The first upstream turn portion 31b is connected at its upstream end to the downstream end of the first upstream linear portion 31a and is bent to change the direction of the channel portion from the horizontal direction to an upward and downward direction in the cathode separator 11. The second upstream linear portion 31c is connected at its upstream end to the downstream end of the first upstream turn portion 31b and extends from the upper portion toward the lower portion of the cathode separator 11 (extend in a vertical direction). The second upstream turn portion 31d is connected at its upstream end to the downstream end of the second upstream linear portion 31c and is bent to change the direction of channel portion from the vertical direction to the horizontal direction. The third upstream linear portion 31e is connected at its upstream end to the downstream end of the second upstream turn portion 31d and extends in the horizontal direction from the second side portion toward the first side portion. The third upstream turn portion 31f is connected at its upstream end to the downstream end of the third upstream linear portion 31e and is bent to change the direction of channel portion from the horizontal direction to the upward and downward direction in the cathode separator 11.

The midstream portion 131b has a spiral shape. To be specific, the channel portion of the midstream portion 131b is formed to extend clockwise from the peripheral portion of the cathode separator 11 toward its center portion in a convergent manner, then turn back at the central portion of the cathode separator 11 and extend counterclockwise toward the peripheral portion of the cathode separator 11 in a divergent manner.

More specifically, the midstream portion 131b vertically extends a certain distance from the downstream end of the third upstream turn portion 31f of the upstream portion 131a in a direction from the lower portion toward the upper portion of the cathode separator 11 (hereinafter this direction is referred to as upward direction), then horizontally extends a certain distance in a direction from the first side portion toward the second side portion (hereinafter this direction is referred to as second lateral direction), then vertically extends a certain distance from the upper portion toward the lower portion of the cathode separator 11 (hereinafter this direction is hereinafter referred to as downward direction), and then horizontally extends a certain distance in the first lateral direction to reach the center portion of the cathode separator 11. Then, the midstream portion 131b turns back at the center portion, then horizontally extends a certain distance in the second lateral direction, then vertically extends a certain distance in the upward direction in the cathode separator 11, then horizontally extends a certain distance in the first lateral direction, then vertically extends a certain distance in the downward direction, then horizontally extends a certain distance in the second lateral direction, and then vertically extends a certain distance in the upward direction to reach the upstream end of the downstream portion 131c.

The downstream portion 131c is composed of a first downstream turn portion 31g, a first downstream linear portion 31h, a second downstream turn portion 31i, a second downstream linear portion 31j, a third downstream turn portion 31k, and a third downstream linear portion 31m.

The first downstream turn portion 31g is connected at its upstream end, to the downstream end of the midstream portion 131b and is bent to change the direction of channel portion from the vertical direction to the horizontal direction. The first downstream linear portion 31h is connected at its upstream end to the downstream end of the first downstream turn portion 31g and horizontally extends in the first lateral direction. The second downstream turn portion 31i is connected at its upstream end to the downstream end of the first downstream linear portion 31h and is bent to change the direction of channel portion from the horizontal direction to the vertical direction. The second downstream linear portion 31j is connected at its upstream end to the second downstream turn portion 31i and vertically extends in the downward direction. The second downstream turn portion 31k is connected at its upstream end to the second downstream linear portion 31j and is bent to change the direction of the channel from the vertical direction to the horizontal direction. The third downstream linear portion 31m is connected at its upstream end to the downstream end of the second downstream turn portion 31k, horizontally extends in the second lateral direction and is connected at its downstream end to the oxidizing gas discharge manifold hole 22.

The first oxidizing gas channel 131 is thus constituted by the linear portions extending in the vertical and horizontal directions and the turn portions bent to change the direction of channel portion from the vertical direction to the horizontal direction and from the horizontal direction to the vertical direction, such that the first oxidizing gas channel 131 is shaped to be bent as a whole. The second oxidizing gas channels 132 and 133 are arranged to run along the first oxidizing gas channel 131. The second oxidizing gas channels 132 and 133 do not exist (are not provided) between a first portion 41 of the first oxidizing gas channel 131 as described later and the upstream end of the first oxidizing gas channel 131 in a direction parallel to the main surface of the cathode separator 11, but exist (are provided) between the downstream end of the first oxidizing gas channel 131 and a second portion 51 of the first oxidizing gas channel 131 as described later in the direction parallel to the main surface of the cathode separator 11.

In the first oxidizing gas channel 131, the downstream portion 131c has the first portion 41 and the upstream portion 131a has the second portion 51. The first portion 41 is a portion located closest to the upstream end of the first oxidizing gas channel 131, in a portion of the first oxidizing gas channel 131 which lies between the downstream end thereof and the second portion 51 thereof. In other words, the first portion 41 is a portion having a largest pressure gradient relative to the upstream portion 131a, in the downstream portion 131a of the first oxidizing gas channel 131 (i.e., the portion to which the largest amount of reactant gas shortcuts from the upstream portion 131a of the first oxidizing gas channel 131). To be specific, in this embodiment, the portion, which is located closest to the upstream end of the first oxidizing gas channel 131, in the second downstream turn portion 31i of the downstream portion 131c, constitutes the first portion 41.

The first oxidizing gas channel 131 is configured such that the cross-sectional area of the channel portion of a first specified portion (in this embodiment, the first upstream linear portion 31a) which is a continuous portion extending from the upstream end is smaller than the cross-sectional areas of the second oxidizing gas channels 132 and 133. To be specific, the width of the channel portion of the first upstream linear portion 31a of the first oxidizing gas channel 131 is smaller than the widths of the second oxidizing gas channels 132 and 133. The continuous portion extending from the upstream end of first oxidizing gas channel 131 means that the channel portion is formed continuously with the upstream end of the first oxidizing gas channel 131 (the reactant gas can flow through the channel portion).

With the above configuration, the oxidizing gas supplied to the upstream end of the first oxidizing gas channel 131 through the oxidizing gas supply manifold hole 21 is less in amount than the oxidizing gas supplied to the upstream ends of the second oxidizing gas channels 132 and 133 through the oxidizing gas supply manifold hole 21. This is because, in a case where a plurality of reactant gas channels running along one another have an equal channel length, the reactant gas is divided in a ratio according to the cross-sectional area of the channel portion to keep a constant gas pressure, and therefore the flow rate of the gas supplied to the gas channel can be decreased by reducing the size of the cross-sectional area of its channel portion.

Since the flow rate of the oxidizing gas flowing through the first specified portion (first upstream linear portion 31a) of the first oxidizing gas channel 131 is lessened, it is possible to reduce the amount of the oxidizing gas flowing (shortcutting) to a channel portion 31z (horizontally extending portion of the first downstream turn portion 31g, the first downstream linear portion 31h, and the horizontally extending portion of the second downstream turn portion 31i) which is located closest to the first upstream linear portion 31a of the downstream portion 131c of the first oxidizing gas channel 131 via the cathode gas diffusion layer 3b. As a result, it is possible to reduce the amount of the oxidizing gas which will be discharged from the oxidizing gas discharge manifold hole 22 without being consumed in the reaction with the fuel gas.

The first oxidizing gas channel 131 is formed such that the cross-sectional area (in this embodiment, width of the channel portion) of the first upstream linear portion 31a which is the first specified portion is smaller than the cross-sectional area (in this embodiment, width of the channel portion) of the portion of the first oxidizing gas channel 131 which is other than the first upstream linear portion 31*a*, and the cross-sectional area of the portion of the first oxidizing gas channel 131 which is other than the first upstream linear portion is substantially equal to the cross-sectional areas of the second oxidizing gas channels 132 and 133. Thus, the flow rate of the oxidizing gas flowing through the portion of the first oxidizing gas channel 131 which is other than the first upstream linear portion 31*a* can be made substantially equal to the flow rate of the oxidizing gas flowing through the second oxidizing gas channels 132 and 133. As a result, a sufficient amount of oxidizing gas can be supplied to the cathode 4*b*.

The second portion 51 is a portion located closest to the downstream end of the first oxidizing gas channel 131, in the portion of the first oxidizing gas channel 131 which lies between the first portion 41 thereof and the upstream end thereof. In other words, the second portion 51 is a portion located most distant from the upstream end of the first oxidizing gas channel 131, in the portion of the first oxidizing gas channel 131 which lies between the first portion 41 thereof and the upstream end thereof, when viewed in the direction from the upstream end toward the downstream end of the first oxidizing gas channel 131, and is a portion having a largest pressure gradient relative to the downstream portion 131*c*, in the upstream portion 131*a* of the first oxidizing gas channel 131. To be specific, in this first embodiment, the second upstream turn portion 31*d* of the upstream portion 131*a* constitutes the second portion 51.

[Function and Advantage of Fuel Cell]

Next, the function and advantage of the fuel cell 100 according to Embodiment 1 will be described with reference to FIGS. 1 and 2.

As described above, because of the pressure difference generated between the oxidizing gas flowing through the first upstream linear portion 31*a* of the upstream portion 131*a* in the first oxidizing gas channel 131 and the oxidizing gas flowing through the channel portion 31*z* located closest to the first upstream portion 31*a* in the first oxidizing gas channel 131, a part of the oxidizing gas flowing through the upstream portion 131*a* flows into the channel portion 31*z* (especially first portion 41 of the first oxidizing gas channel 131) of the first oxidizing gas channel 131 via the cathode gas diffusion layer 3*b*.

Since the oxidizing gas flowing through the upstream portion 131*a* of the first oxidizing gas channel 131 shortcuts, a pressure difference is generated between the oxidizing gas flowing through the upstream portions of the second oxidizing gas channels 132 and 133 and the oxidizing gas flowing through the upstream portion 131*a* of the first oxidizing gas channel 131. Because of the pressure difference, a part of the oxidizing gas flowing through the upstream portions of the second oxidizing gas channels 132 and 133 flows into the upstream portion 131*a* of the first oxidizing gas channel 131. Then, a part of the oxidizing gas which has flowed from the second oxidizing gas channels 132 and 133 into the first oxidizing gas channel 131 flows into the channel portion 31*z* of the first oxidizing gas channel 131 (especially, the first portion 41 of the first oxidizing gas channel 131) of the first oxidizing gas channel 131. As a whole, a part of the oxidizing gas flowing through the first oxidizing gas channel 131 and the second oxidizing gas channels 132 and 133 flows into the channel portion 31*z* (especially, first portion 41) of the first oxidizing gas channel 131.

For this reason, since a part of the oxidizing gas flowing through the first oxidizing gas channel 131 and the second oxidizing gas channels 132 and 133 shortcuts to the channel portion 31*z* (especially, first portion 34) of the first oxidizing gas channel 131, such a gas is discharged into the oxidizing gas discharge manifold hole 22 without being consumed in the reaction, thereby resulting in a reduced utilization efficiency of the reactant gas.

However, in the fuel cell 100 of Embodiment 1, the cross-sectional area of the channel portion of the first upstream linear portion 31*a* of the first oxidizing gas channel 131 is made smaller than the cross-sectional area of the portion of the first oxidizing gas channel 131 which is other than the first upstream linear portion 31*a* and the cross-sectional areas of the second oxidizing gas channels 132 and 133. Since the flow rate of the oxidizing gas flowing through the first upstream linear portion 31*a* of the first oxidizing gas channel 131 is lessened in this configuration, it is possible to reduce the amount of the oxidizing gas flowing (shortcutting) to the channel portion 31*z* (especially first portion 41) of the first oxidizing gas channel 131 via the cathode gas diffusion layer 3*b*.

Since it is possible to reduce the amount of the oxidizing gas shortcutting from the upstream portion 131*a* to the channel portion 31*z* in the first oxidizing gas channel 131, it is possible to reduce a pressure difference generated between the oxidizing gas flowing through the upstream portions of the second oxidizing gas channels 132 and 133 and the oxidizing gas flowing through the upstream portion 131*a* of the first oxidizing gas channel 131, and it is possible to reduce the amount of the oxidizing gas which shortcuts from the upstream portions of the second oxidizing gas channels 132 and 133 to the channel portion 31*z* of the first oxidizing gas channel 131 via the upstream portion 131*a* of the first oxidizing gas channel 131.

Therefore, it is possible to reduce the amount of the oxidizing gas which will be discharged from the oxidizing gas discharge manifold hole 22 without being consumed in the reaction with the fuel gas, in the oxidizing gas flowing through the first and second oxidizing gas channels 131~133. As a result, a utilization efficiency of the reactant gas can be improved.

Furthermore, in the fuel cell 100 of Embodiment 1, the cross-sectional area of the portion of the first oxidizing gas channel 131 which is other than the first upstream linear portion 31*a* is made substantially equal to the cross-sectional areas of the second oxidizing gas channels 132 and 133. For this reason, the flow rate of the oxidizing gas flowing through the portion of the first oxidizing gas channel 131 which is other than the first upstream linear portion 31*a* is substantially equal to the flow rate of the oxidizing gas flowing through the second oxidizing gas channels 132 and 133, and therefore the oxidizing gas can be supplied to the cathode 4*b* with a sufficient amount. As a result, the fuel cell 100 can carry out power generation sufficiently.

As should be appreciated from the above, in accordance with the fuel cell 100 of Embodiment 1, it is possible to reduce the amount of the reactant gas which will be discharged without being consumed in the reaction and improve a utilization efficiency of the reactant gas.

(Embodiment 2)

Figure 3:
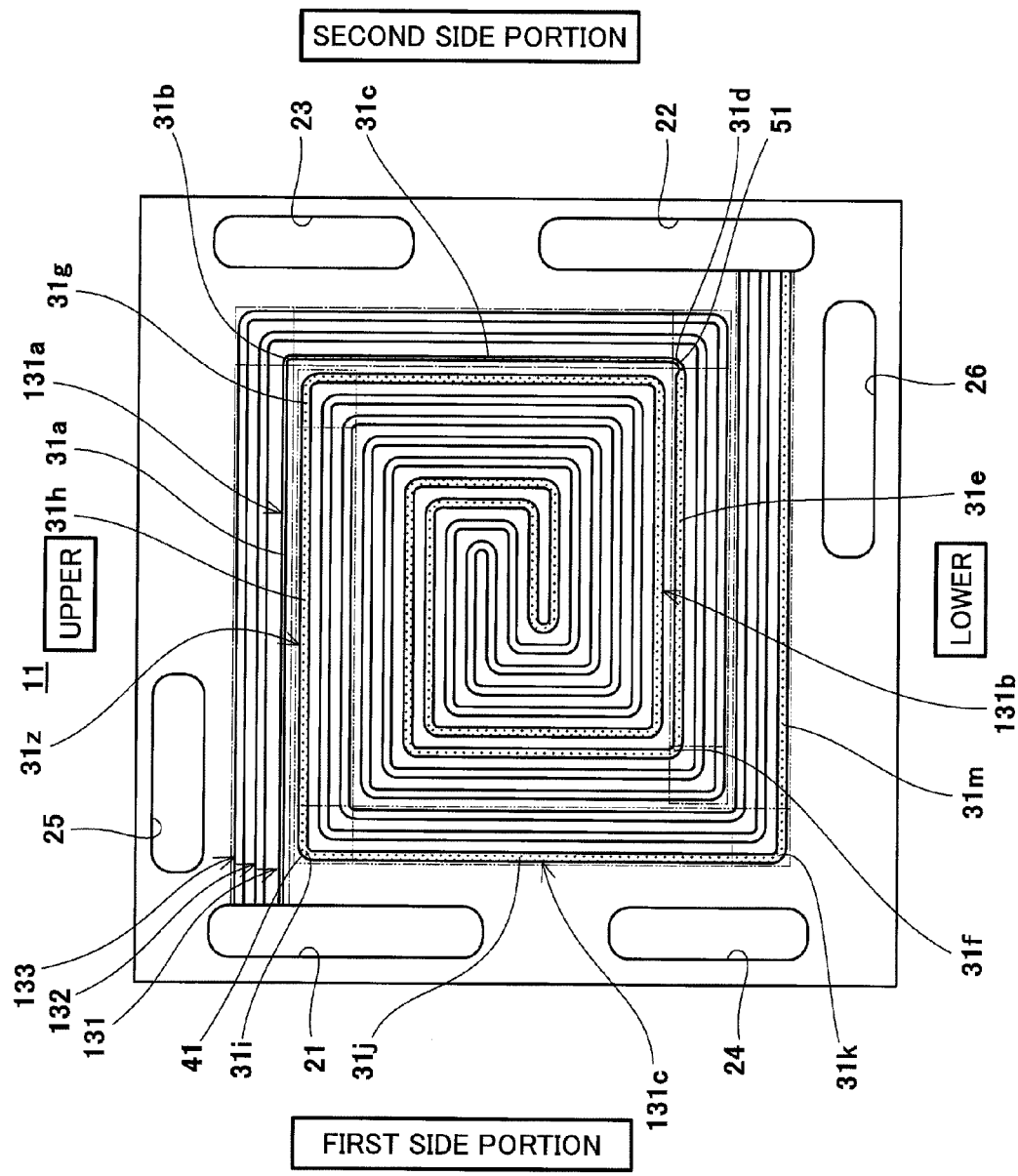
FIG. 3 is a schematic view showing a configuration of a fuel cell separator according to Embodiment 2 of the present invention.

FIG. 3 is a schematic view showing a configuration of a fuel cell separator according to Embodiment 2 of the present invention.

As shown in FIG. 3, a fuel cell separator (cathode separator) 11 according to Embodiment 2 is identical in basic configuration to the fuel cell separator (cathode separator) 11 of Embodiment 1, but is different from the same in configuration of the first specified portion of the first oxidizing gas channel 131. To be specific, the first specified portion of the first oxidizing gas channel 131 is configured such that its upstream end is the upstream end of the first oxidizing gas channel 131 and its downstream end is the second portion 51. The first specified portion of the first oxidizing gas channel 131 is composed of the first upstream linear portion 31a, the upstream turn portion 31b and the second upstream linear portion 31c.

The fuel cell including the fuel cell separator 11 according to Embodiment 2 configured as described above can achieve the function and advantages similar to those of the fuel cell 100 of Embodiment 1.

(Embodiment 3)

Figure 4:
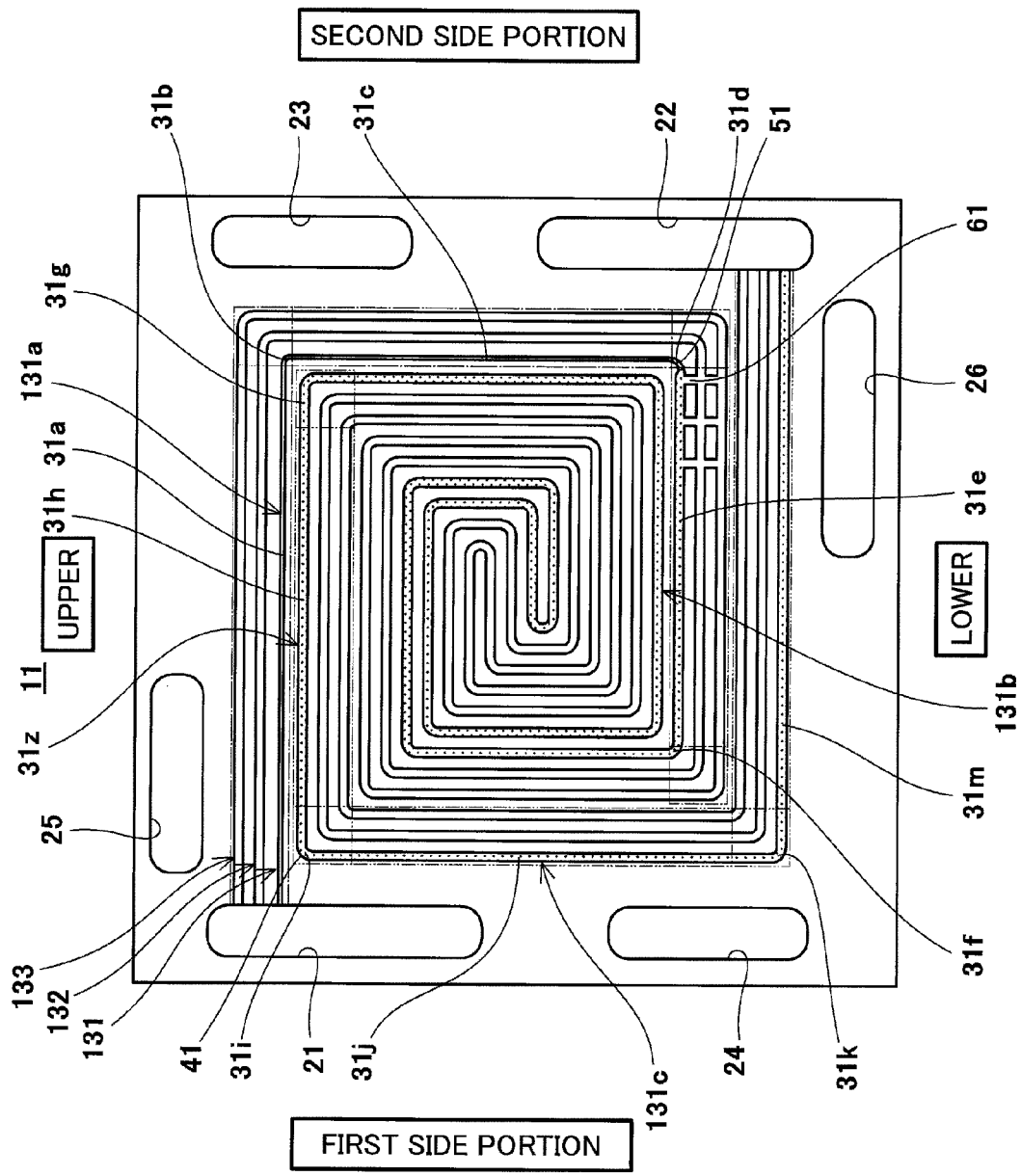
FIG. 4 is a schematic view showing a configuration of a fuel cell separator according to Embodiment 3 of the present invention.

FIG. 4 is a schematic view showing a configuration of a fuel cell separator according to Embodiment 3 of the present invention.

As shown in FIG. 4, a fuel cell separator (cathode separator) 11 according to Embodiment 3 is identical in basic configuration to the fuel cell separator (cathode separator) 11 of Embodiment 2, but is different from the same in that a plurality of (in this embodiment, three) communication channels 61 are provided at a region (in this embodiment, third upstream linear portion 31e) downstream of the first specified portion of the first oxidizing gas channel 131 such that the communication channels 61 are arranged at prescribed intervals to allow the first oxidizing gas channel 131, the second oxidizing gas channel 132 and the second oxidizing gas channel 133 to communicate with one another.

The fuel cell including the fuel cell separator 11 according to Embodiment 3 configured as described above can achieve the function and advantages similar to those of the fuel cell 100 of Embodiment 2.

In accordance with the fuel cell including the fuel separator 11 according to Embodiment 3, the oxidizing gas which has flowed through the portions of the second oxidizing gas channels 132 and 133 which run along the first specified portion of the first oxidizing gas channel 131 flows through the communication channels 61. This allows the oxidizing gas to flow substantially uniformly through the first oxidizing gas channel 131 and the second oxidizing gas channels 132 and 133. Therefore, the communication channels 61 can reduce a variation in the amount of the oxidizing gas supplied to the upstream end of the first oxidizing gas channel 131 and the upstream ends of the second oxidizing gas channels 132 and 133. By reducing the variation in the amount of the oxidizing gas flowing through the first and second oxidizing gas channels 131~133, the utilization efficiency of the oxidizing gas can be improved.

Although the communication channels 61 are provided to allow the first oxidizing gas channel 131 and the second oxidizing gas channels 132 and 133 to communicate with one another in Embodiment 3, the present invention is not limited to this. A recess may be provided to allow the first oxidizing gas channel 131 and the second oxidizing gas channels 132 and 133 to communicate with one another, and a plurality of projections may be provided to extend vertically from the bottom surface of the recess. In such a configuration, the oxidizing gas which has flowed through the first specified portion of the first oxidizing gas channel 131, and the oxidizing gas which has flowed through the portions of the second oxidizing gas channels 132 and 133 which run along the first specified portion of the first oxidizing gas channel 131, are joined at the recess. The flow of the oxidizing gas joined at the recess is disturbed and mixing of the oxidizing gas is facilitated because of the plurality of projections arranged in a stripe shape at the recess. The mixed oxidizing gas is divided at the downstream end of the recess to flow substantially uniformly through the first oxidizing gas channel 131 and the second oxidizing gas channels 132 and 133. Therefore, the recess can reduce a variation in the amount of the oxidizing gas supplied to the upstream end of the first oxidizing gas channel 131 and the upstream ends of the second oxidizing gas channels 132 and 133.

Although the communication channels 61 are provided to allow the first oxidizing gas channel 131 and the second oxidizing gas channels 132 and 133 to communicate with one another in Embodiment 3, the present invention is not limited to this. Alternatively, the communication channels 61 or the recess may be provided to provide communication only between the first oxidizing gas channel 131 and the second oxidizing gas channel 132.

In the configuration in which three or more second oxidizing gas channels are provided, the communication channels 61 may be configured as desired so long as the communication channels 61 are provided to allow communication between the first oxidizing gas channel 131 and at least the second oxidizing gas channel located closest to the first oxidizing gas channel 131, among the plurality of second oxidizing gas channels. For example, the communication channels 61 may be provided to provide communication between the first oxidizing gas channel 131 and the second oxidizing gas channels other than the second oxidizing gas channel located most distant from the first oxidizing gas channel 131, among the plurality of second oxidizing gas channels.

(Embodiment 4)

Figure 5:
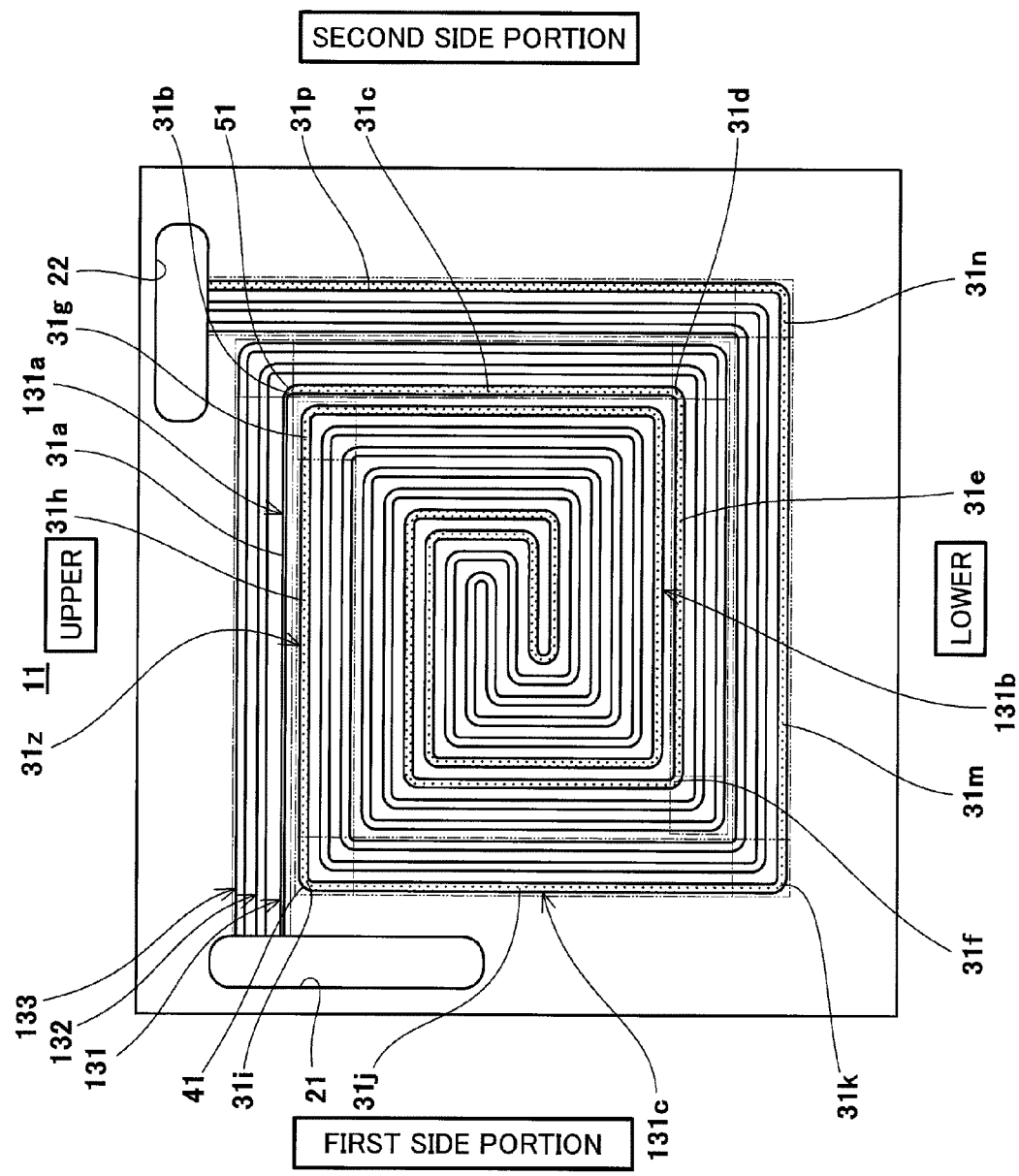
FIG. 5 is a schematic view showing a configuration of a fuel cell separator according to Embodiment 4 of the present invention.

FIG. 5 is a schematic view showing a configuration of a fuel cell separator according to Embodiment 4 of the present invention. In FIG. 5, only the oxidizing gas supply manifold hole 21 and the oxidizing gas discharge manifold hole 22 are illustrated and other manifold holes are not illustrated.

As shown in FIG. 5, a fuel cell separator (cathode separator) 11 according to Embodiment 5 is identical in basic configuration to the fuel cell separator (cathode separator) 11 of Embodiment 1, but is different from the same in the position of the oxidizing gas discharge manifold hole 22, the configuration of the downstream portion of the first oxidizing gas channel 131, and the configuration of the downstream portions of the second oxidizing gas channels 132 and 133.

To be specific, the oxidizing gas discharge manifold hole 22 is provided at the upper portion of the second side portion. The downstream portion 131c of the first oxidizing gas channel 131 is composed of the first downstream turn portion 31g, the first downstream linear portion 31h, the second downstream turn portion 31i, the second downstream linear portion 31j, the third downstream turn portion 31k, the third downstream linear portion 31m, a fourth downstream turn portion 31n, and a fourth downstream linear portion 31p. The portion of the downstream portion 131c from the upstream end to the third downstream linear portion 31m is configured similarly to the downstream portion 131c of the first oxidizing gas channel 131 of the cathode separator 11 of Embodiment 1. The downstream portion 131c of the first oxidizing gas channel 131 is configured in such a manner that the upstream end of the fourth downstream turn portion 31n which bends the direction of the channel portion from the horizontal direction to the vertical direction is connected to the downstream end of the third downstream linear portion 31m, the upstream end of the fourth downstream linear portion 31p vertically upwardly extending is connected to the downstream end of the fourth downstream turn portion 31n, and the downstream end of the fourth downstream linear portion 31p is connected to the oxidizing gas discharge manifold hole 22.

Since the second oxidizing gas channels 132 and 133 are configured similarly to the first oxidizing gas channel 131, they will not be described repetitively. Since the downstream portion 131c of the first oxidizing gas channel 131 is configured as described above, the second portion 51 located closest to the downstream end of the first oxidizing gas channel 131, in the portion of the first oxidizing gas channel 131 which lies between the upstream end thereof and the first portion 41 thereof, is the first upstream turn portion 31b of the upstream portion 131a.

The fuel cell including the fuel cell separator 11 according to Embodiment 4 configured as described above can achieve the function and advantages similar to those of the fuel cell 100 of Embodiment 1.

(Embodiment 5)

Figure 6:
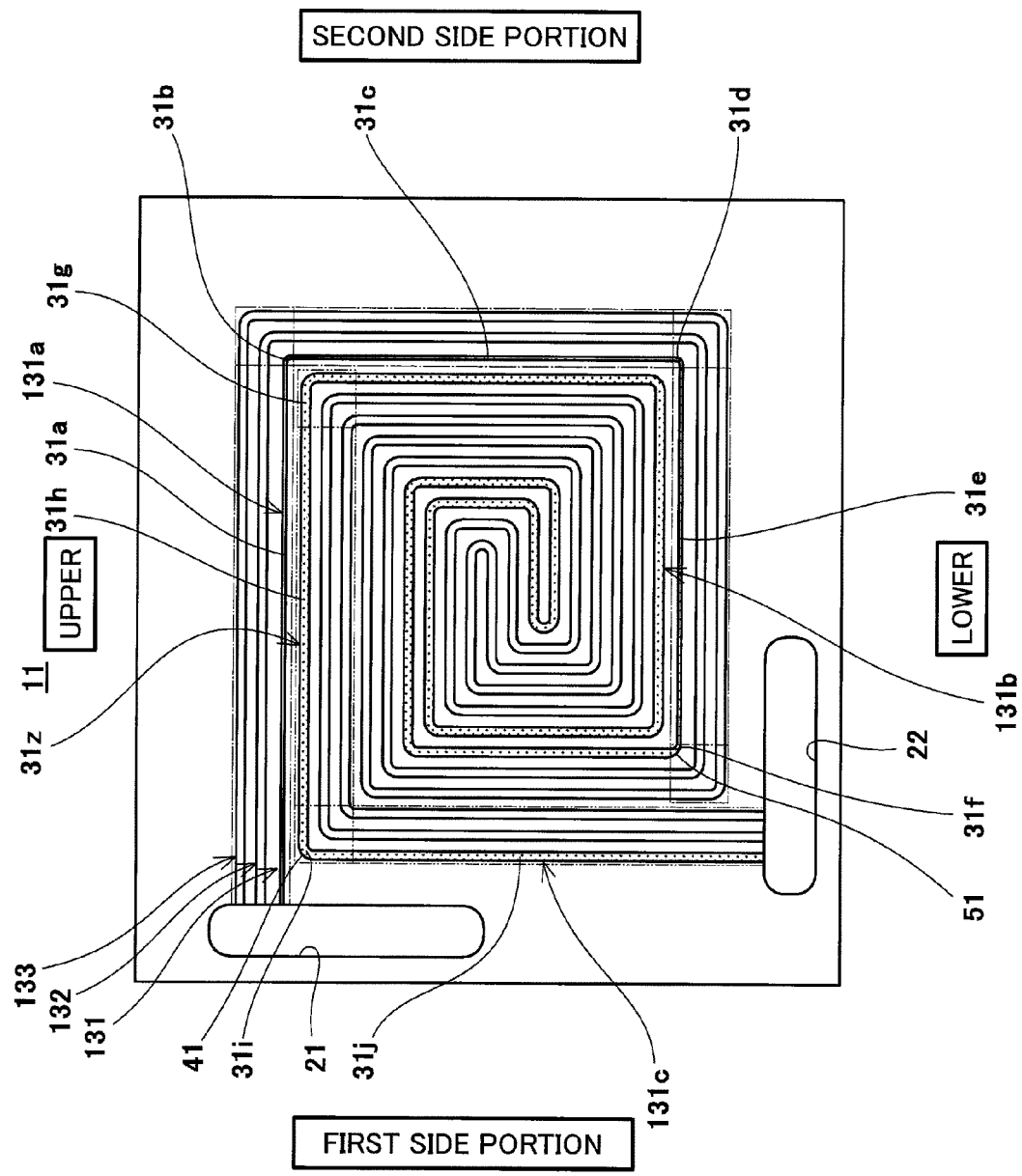
FIG. 6 is a schematic view showing a configuration of a fuel cell separator according to Embodiment 5 of the present invention.

FIG. 6 is a schematic view showing a configuration of a fuel cell separator according to Embodiment 5 of the present invention. In FIG. 6, only the oxidizing gas supply manifold hole 21 and the oxidizing gas discharge manifold hole 22 are illustrated and other manifold holes are not illustrated.

As shown in FIG. 6, a fuel cell separator (cathode separator) 11 according to Embodiment 5 is identical in basic configuration to the fuel cell separator (cathode separator) 11 of Embodiment 1, but is different from the same in the position of the oxidizing gas discharge manifold hole 22, the configuration of the downstream portion of the first oxidizing gas channel 131 and the configuration of the downstream portions of the second oxidizing gas channels 132 and 133, and the configuration of the first specified portion of the first oxidizing gas channel 131.

To be specific, the oxidizing gas discharge manifold hole 22 is provided at the lower portion of the first side portion. The downstream portion 131c of the first oxidizing gas channel 131 has a substantially-L shape and is composed of the first downstream turn portion 31g, the first downstream linear portion 31h, the second downstream turn portion 31i, and the second downstream linear portion 31j.

The first specified portion of the first oxidizing gas channel 131 is composed of the entire upstream portion 131a, i.e., the first upstream linear portion 31a, the first upstream turn portion 31b, the second upstream linear portion 31c, the second upstream turn portion 31d, the third upstream linear portion 31e, and the third upstream turn portion 31f.

Since the second oxidizing gas channels 132 and 133 are configured similarly to the first oxidizing gas channel 131, they will not be described repetitively. Since the downstream portion 131c of the first oxidizing gas channel 131 is configured as described above, the second portion 51 located closest to the downstream end of the first oxidizing gas channel 131, in the portion of the first oxidizing gas channel 131 which lies between the upstream end thereof and the first portion 41 thereof, is the third upstream turn portion 31f of the upstream portion 131a.

The fuel cell including the fuel cell separator 11 according to Embodiment 5 configured as described above can achieve the advantages similar to those of the fuel cell 100 of Embodiment 1.

(Embodiment 6)

Figure 7:
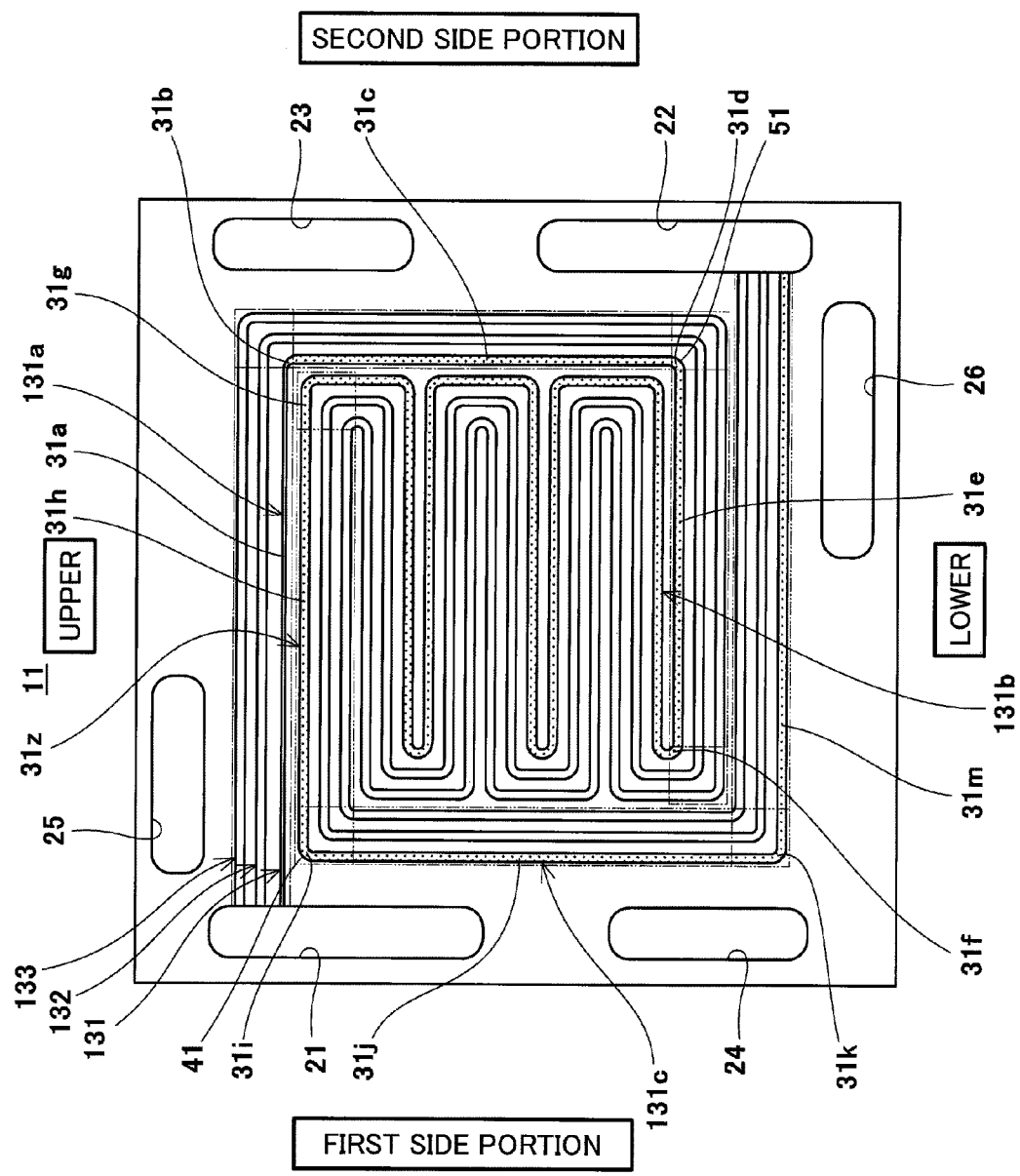
FIG. 7 is a schematic view showing a configuration of a fuel cell separator according to Embodiment 6 of the present invention.

FIG. 7 is a schematic view showing a configuration of a fuel cell separator according to Embodiment 6 of the present invention.

As shown in FIG. 7, a fuel cell separator (cathode separator) 11 according to Embodiment 6 is identical in basic configuration to the fuel cell separator (cathode separator) 11 of Embodiment 1, but is different from the same in that the midstream portion of the first oxidizing gas channel 131 and the midstream portions of the second oxidizing gas channels 132 and 133 have a serpentine shape. Hereinafter, the configuration of the midstream portion of the first oxidizing gas channel 131 will be described.

The midstream portion 131b of the first oxidizing gas channel 131 is configured such that its channel portion extends in the upward direction from the downstream end of the upstream portion 131a, then turns 180 degrees, then horizontally extends a certain distance in the second lateral direction, then extends a certain distance in the upward direction, and then horizontally extends a certain distance in the first lateral direction. After this extension pattern is repeated once, the channel portion extends in the upward direction, then turns 180 degrees, then horizontally extends a certain distance in the second lateral direction, and then extends a certain distance in the upward direction, to reach the upstream end of the downstream portion 131c.

The fuel cell including the fuel cell separator 11 according to Embodiment 6 configured as described above can achieve the function and advantages similar to those of the fuel cell 100 of Embodiment 1.

(Embodiment 7)

Figure 8:
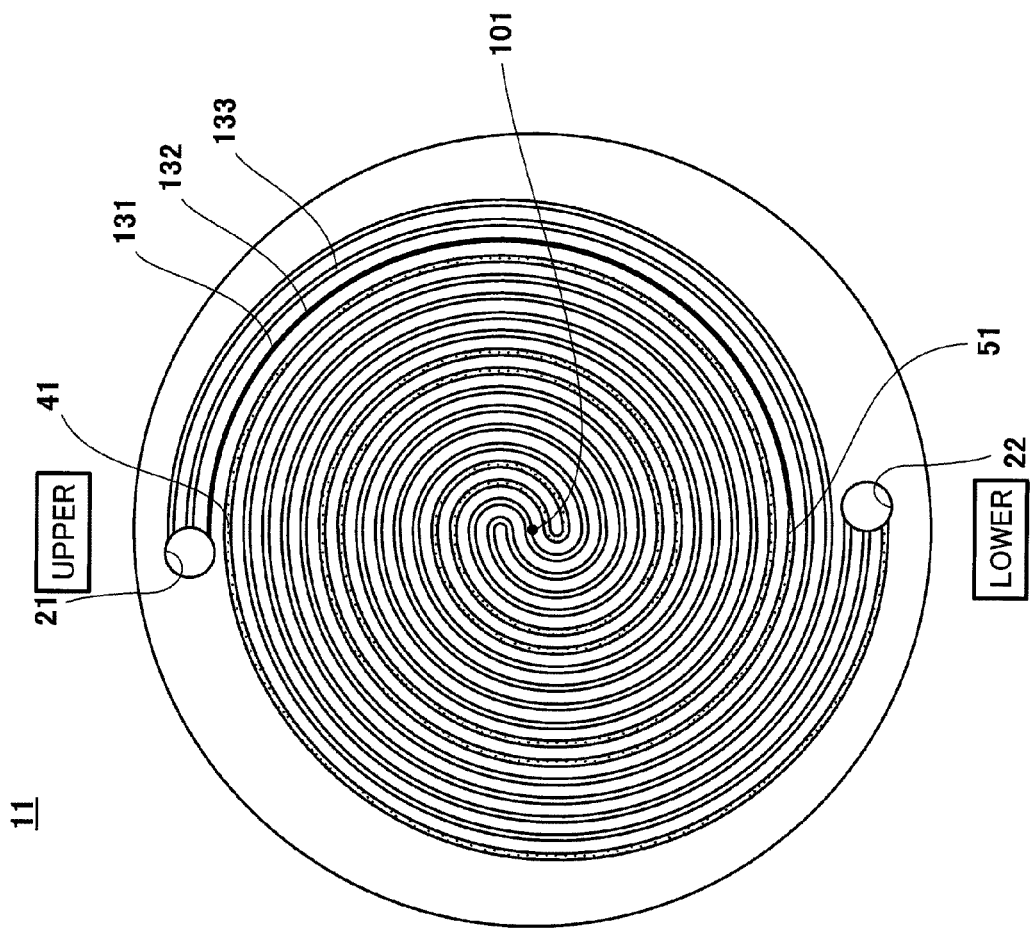
FIG. 8 is a schematic view showing a configuration of a fuel cell separator according to Embodiment 7 of the present invention.

FIG. 8 is a schematic view showing a configuration of a fuel cell separator according to Embodiment 7 of the present invention. In FIG. 8, only the oxidizing gas supply manifold hole 21 and the oxidizing gas discharge manifold hole 22 are illustrated and other manifold holes are not illustrated.

As shown in FIG. 8, the fuel cell separator (cathode separator) 11 according to Embodiment 7 has a disc-shape and is provided on a main surface thereof with the first oxidizing gas channel 131 and the two second oxidizing gas channels such that these channels run along one another. The oxidizing gas supply manifold hole 21 and the oxidizing gas discharge manifold hole 22 are arranged opposite to each other to sandwich the center portion (center axis 101) of the cathode separator 11. Although the oxidizing gas supply manifold hole 21 and the oxidizing gas discharge manifold hole 22 are arranged opposite to each other to sandwich the center portion of the cathode separator 11, the present invention is not limited to this. These manifold holes may be positioned anywhere in the peripheral region of the cathode separator 11.

The first oxidizing gas channel 131 and the second oxidizing gas channels 132 and 133 entirely have a spiral shape. To be specific, the channels extend clockwise in a circular-arc shape such that the channels extending from the upstream ends converge toward the center portion of the cathode separator 11, turn back at the center portion of the cathode separator 11 and extend counterclockwise in a circular-arc shape such that they diverge toward the peripheral region of the cathode separator 11.

The first oxidizing gas channel 131 includes the first portion 41 and the second portion 51. As described above, the first portion is a portion located closest to the upstream end of the first oxidizing gas channel 131, in the portion of the first oxidizing gas channel 131 which lies between the downstream end thereof and the second portion 51 thereof. In this embodiment, the first portion 41 is constituted by a portion located closest to the outer periphery of the separator 11, in the portion of the first oxidizing gas channel 131, which portion intersects a line connecting the upstream end of the first oxidizing gas channel 131 to a center axis 101. The second portion 51 is a portion located closest to the downstream end of the first oxidizing gas channel 131, in the portion of the first oxidizing gas channel 131 which lies between the first portion 41 thereof and the upstream end thereof. In this embodiment, the second portion 51 is constituted by a portion located closest to the outer periphery of the separator 11, in the portion of the first oxidizing gas channel 131, which portion intersects a line connecting the downstream end of the first oxidizing gas channel 131 to the center axis 101.

The first specified portion of the first oxidizing gas channel 131 extends from the upstream end to the second portion 51 in the first oxidizing gas channel 131.

The fuel cell including the fuel cell separator 11 according to Embodiment 7 configured as described above can achieve the function and advantages similar to those of the fuel cell 100 of Embodiment 1.

(Embodiment 8)

[Configuration of Fuel Cell Separator]

Figure 10:
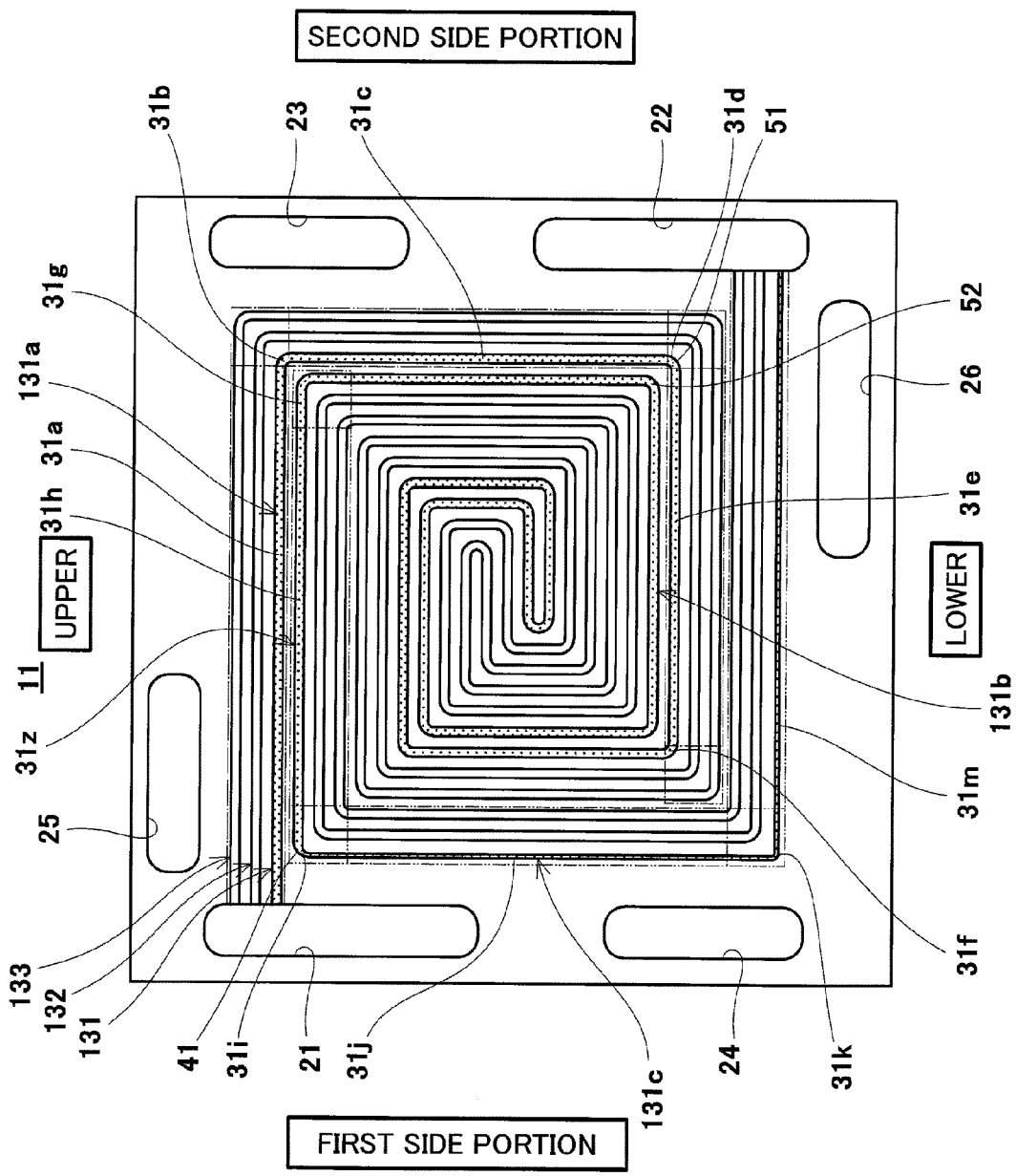
FIG. 10 is a schematic view showing a configuration of a fuel cell separator according to Embodiment 8 of the present invention.

FIG. 10 is a schematic view showing a configuration of a fuel cell separator according to Embodiment 8 of the present invention.

As shown in FIG. 10, a fuel cell separator (cathode separator) 11 according to Embodiment 8 is identical in basic configuration to the fuel cell separator (cathode separator) 11 of Embodiment 1, but is different from the same in that the cross-sectional area of the channel portion of a second specified portion (in this embodiment, portion from the first portion 41 to the downstream end) which is a portion downstream of the first portion 41, in the first oxidizing gas channel 131, is made smaller than the cross-sectional areas of the second oxidizing gas channels 132 and 133.

To be specific, the width of the channel portion of the first oxidizing gas channel 131, extending from the first portion 41 to the downstream end is made smaller than the widths of the second oxidizing gas channels 132 and 133. Although the second specified portion of the first oxidizing gas channel 131 is the portion extending from the first portion 41 to the downstream end, the present invention is not limited to this, but the second specified portion may consist of the first portion 41.

The midstream portion 131*b* of the first oxidizing gas channel 131 includes a third portion 52. The third portion 52 is a portion located closest to the second portion 51, in a portion of the first oxidizing gas channel 131 on the main surface of the cathode separator 11, which is located inward relative to the second portion 51. In this embodiment, the third portion 52 is a terminal end of a portion extending downward from the downstream end of the midstream portion 131*b*.

If the oxidizing gas shortcuts from the upstream portion 131 of the first oxidizing gas channel 131 to the channel portion 31*z* (horizontally extending portion of the first downstream turn portion 31*g*, the first downstream linear portion 31*h* and the horizontally extending portion of the second downstream turn portion 31*i*) located closest to the first upstream linear portion 31*a*, a pressure loss in the second specified portion increases momentarily, because of the smaller cross-sectional area of the channel portion of the second specified portion. For this reason, the pressure difference generated between the oxidizing gas flowing through the upstream portion 131*a* of the first oxidizing gas channel 131 and the oxidizing gas flowing through the channel portion 31*z* located closest to the first upstream linear portion 31*a* is lessened. Thus, it is possible reduce the amount of the oxidizing gas shortcutting from the first upstream linear portion 31*a*, and thus reduce the amount of the oxidizing gas which will be discharged from the oxidizing gas discharge manifold hole 22 without being consumed in the reaction with the fuel gas.

The first oxidizing gas channel 131 is configured such that the cross-sectional area (in this embodiment, width of the channel portion of the second specified portion) of the channel portion of the second specified portion which is a portion extending from the first portion 41 to the downstream end is made smaller than the cross-sectional area (width of the channel portion of the portion other than the second specified portion) of the portion which is other than the second specified portion, and the cross-sectional area of the first oxidizing gas channel 131 which is other than the second specified portion is substantially equal to the cross-sectional areas of the second oxidizing gas channels 132 and 133. This makes it possible to make the flow rate of the oxidizing gas flowing through the portion of the first oxidizing gas channel 131 which is other than the second specified portion substantially equal to the flow rate of the oxidizing gas flowing through the second oxidizing gas channels 132 and 133. As a result, it is possible to supply the oxidizing gas to the cathode 4*b* with a sufficient amount.

[Function and Advantage of Fuel Cell]

Next, function and advantage of the fuel cell 100 (fuel cell of Embodiment 8 of the present invention) including the fuel cell separator 11 according to Embodiment 8 will be described with reference to FIG. 10.

Because of the pressure difference generated between the oxidizing gas flowing through the first upstream linear portion 31*a* of the upstream portion 131*a* of the first oxidizing gas channel 131 and the oxidizing gas flowing through the channel portion 31*z* located closest to the first upstream linear portion 31*a* of the first oxidizing gas channel 131, a part of the oxidizing gas flowing through the upstream portion 131*a* flows into the channel portion 31*z* (especially, the first portion 41 of the first oxidizing gas channel 131) of the first oxidizing gas channel 131 via the cathode gas diffusion layer 3*b*.

Since the oxidizing gas flowing through the upstream portion 131*a* of the first oxidizing gas channel 131 shortcuts, a pressure difference is generated between the oxidizing gas flowing through the upstream portions of the second oxidizing gas channels 132 and 133 and the oxidizing gas flowing through the upstream portion 131*a* of the first oxidizing gas channel 131. Because of this pressure difference, a part of the oxidizing gas flowing through the upstream portions of the second oxidizing gas channels 132 and 133, flows into the upstream portion 131*a* of the first oxidizing gas channel 131. Then, a part of the oxidizing gas which has flowed from the second oxidizing gas channels 132 and 133 into the first oxidizing gas channel 131 flows into the first portion 41. As a whole, a part of the oxidizing gas flowing through the first oxidizing gas channel 131 and the second oxidizing gas channels 133 and 133 flows into the channel portion 31*z* (especially first portion 41) of the first oxidizing gas channel 131 which is located closest to the first upstream linear portion 31*a*.

Since a part of the oxidizing gas flowing through the first oxidizing gas channel 131 and the second oxidizing gas channels 132 and 133 shortcuts to the channel portion 31*z* (especially first portion 41) of the first oxidizing gas channel 131, which is located closest to the first upstream linear portion 31*a*, such a gas is discharged into the oxidizing gas discharge manifold hole 22 without being consumed in the reaction, thereby resulting in a reduced utilization efficiency of the reactant gas.

However, in the fuel cell 100 of Embodiment 8, the width of the channel portion (second specified portion) of the first oxidizing gas channel 131 from the first portion 41 to the downstream end is smaller than the widths of the second oxidizing gas channels 132 and 133. Even when the oxidizing gas flowing through the first upstream linear portion 31*a* of the first oxidizing gas channel 131 shortcuts to the first portion 41 of the first oxidizing gas channel 131 via the cathode gas diffusion layer 3*b*, a pressure loss in the second specified portion increases momentarily, because of the smaller cross-sectional area of the second specified portion. With an increase in the pressure loss in the second specified portion, a pressure loss in the channel portion (in this embodiment channel portion located upstream of the first portion 41 of the channel portion 31z) which is located upstream of the second specified portion increases.

For the above reason, the pressure difference generated between the oxidizing gas flowing through the upstream portion 131a of the first oxidizing gas channel 131 and the oxidizing gas flowing through the channel portion 31z is lessened. As a result, it is possible to reduce the amount of the oxidizing gas which shortcuts from the first upstream linear portion 31a to the channel portion 31z.

Since it is possible to reduce the amount of the oxidizing gas which shortcuts from the upstream portion 131a to the channel portion 31z in the first oxidizing gas channel 131, it is possible to reduce the pressure difference generated between the oxidizing gas flowing through the upstream portions of the second oxidizing gas channels 132 and 133 and the oxidizing gas flowing through the upstream portion 131a of the first oxidizing gas channel 131, and to reduce the amount of the oxidizing gas which shortcuts from the upstream portions of the second oxidizing gas channels 132 and 133 to the channel portion 31z via the upstream portion 131a of the first oxidizing gas channel 131.

Therefore, in the fuel cell 100 of Embodiment 8, it is possible to reduce the amount of the oxidizing gas which will shortcut from the upstream portions of the first and second oxidizing gas channels 131~133 to the downstream portion 131c of the first oxidizing gas channel 131 and will be discharged from the oxidizing gas discharge manifold hole 22 without being consumed in the reaction with the fuel gas.

In the fuel cell 100 of Embodiment 8, the cross-sectional area of the portion of the first oxidizing gas channel 131 which is other than the second specified portion is substantially equal to the cross-sectional areas of the second oxidizing gas channels 132 and 133. This makes it possible to make the flow rate of the oxidizing gas flowing through the portion of the first oxidizing gas channel 131 which is other than the second specified portion substantially equal to the flow rate of the oxidizing gas flowing through the second oxidizing gas channels 132 and 133, and hence it is possible to supply the oxidizing gas to the cathode 4b with a sufficient amount. As a result, the fuel cell 100 can carry out power generation sufficiently.

As should be appreciated from the above, the fuel cell 100 of Embodiment 8 is capable of suppressing the reactant gas from shortcutting, to reduce the amount of the reactant gas which will be discharged without being consumed in the reaction, and hence improving the utilization efficiency of the reactant gas.

(Embodiment 9)

Figure 11:
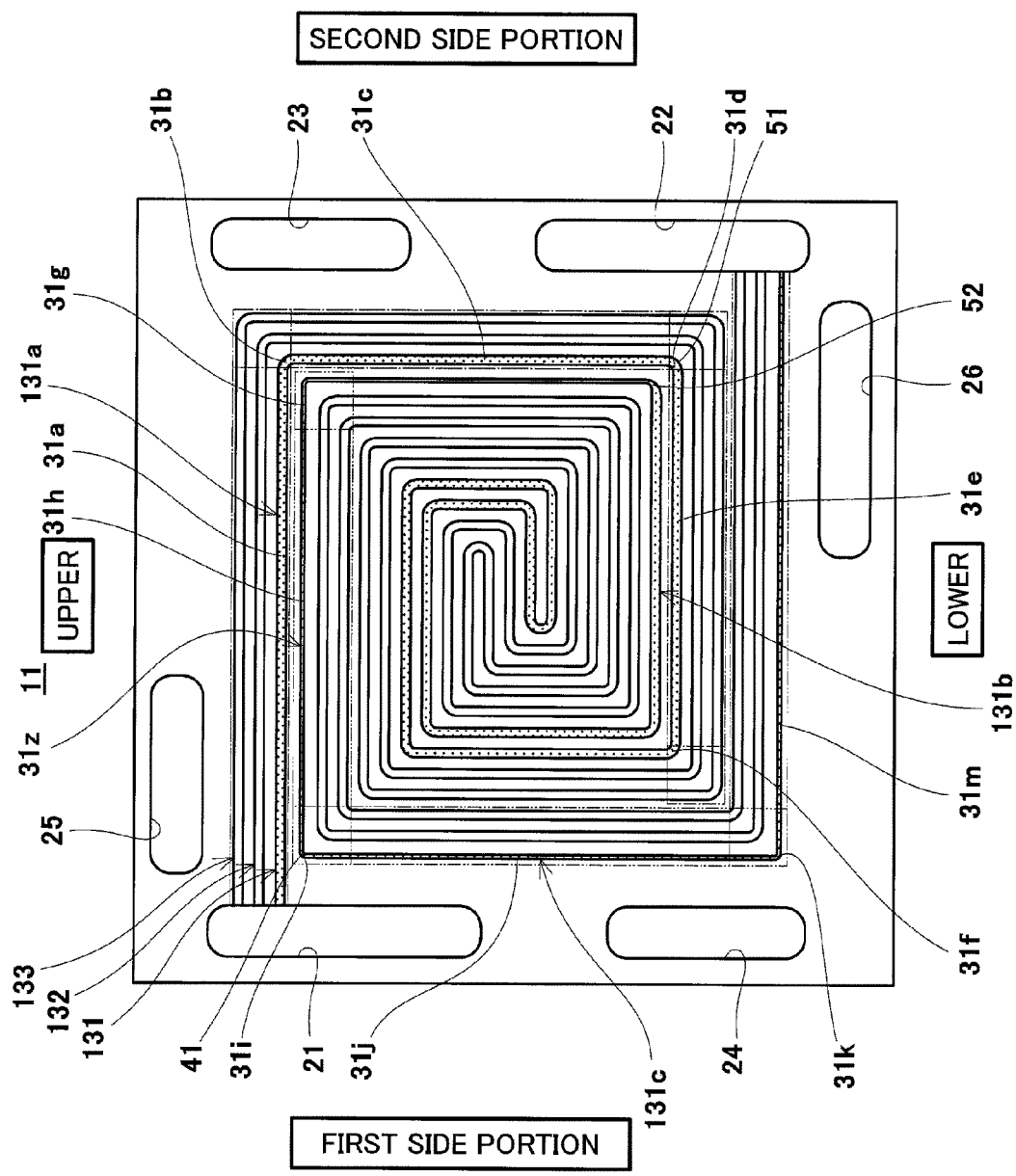
FIG. 11 is a schematic view showing a configuration of a fuel cell separator according to Embodiment 9 of the present invention.

FIG. 11 is a schematic view showing a configuration of a fuel cell separator according to Embodiment 9 of the present invention.

As shown in FIG. 11, a fuel cell separator (cathode separator) 11 according to Embodiment 9 is identical in basic configuration to the fuel cell separator (cathode separator) 11 of Embodiment 8, but is different from the same in that the upstream end of the second specified portion of the first oxidizing gas channel 131 is the third portion 52.

The fuel cell including the fuel cell separator 11 according to Embodiment 9 configured as described above can achieve the function and advantages similar to those of the fuel cell 100 of Embodiment 8.

(Embodiment 10)

Figure 12:
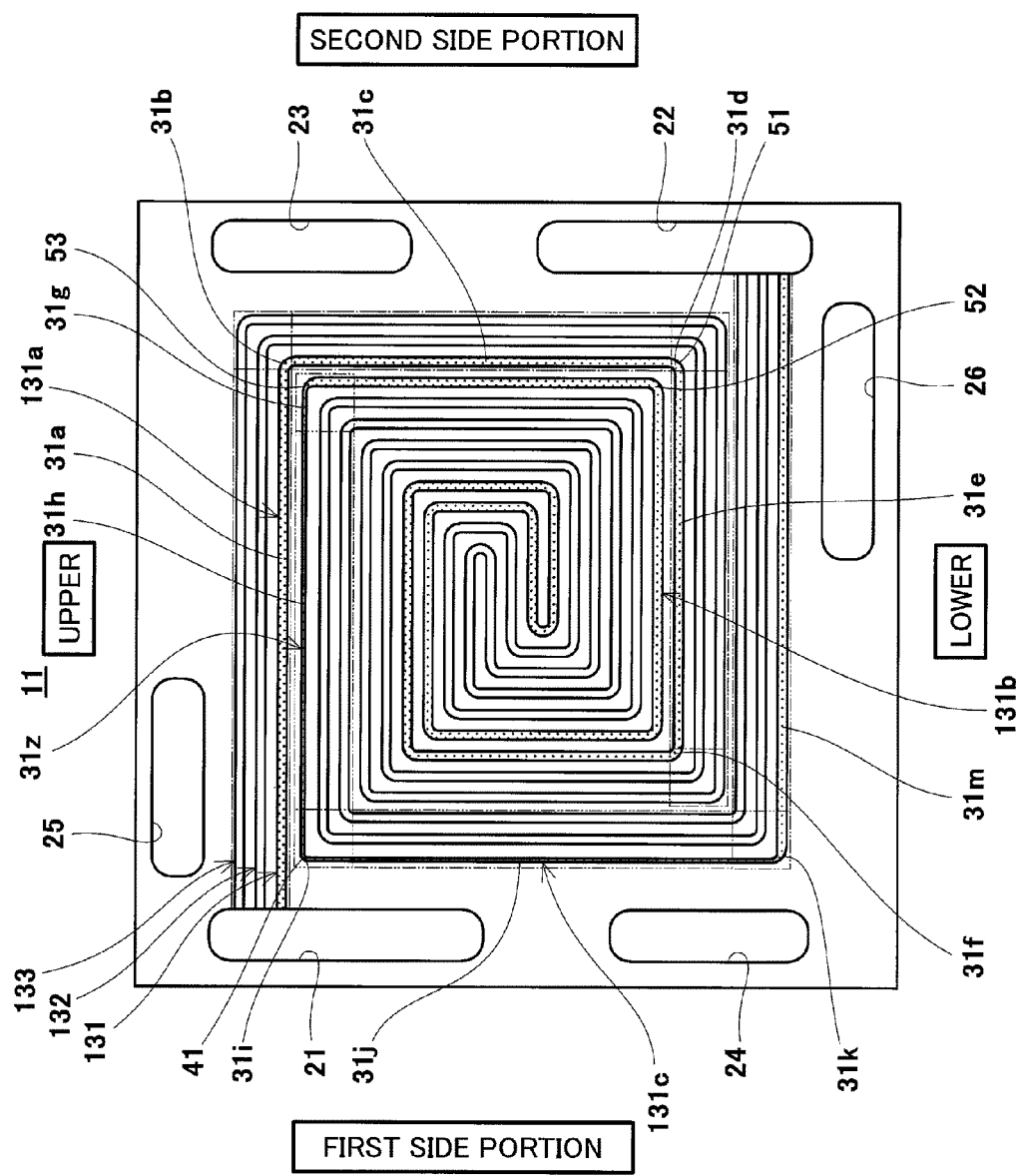
FIG. 12 is a schematic view showing a configuration of a fuel cell separator according to Embodiment 10 of the present invention.

FIG. 12 is a schematic view showing a configuration of a fuel cell separator according to Embodiment 10 of the present invention.

As shown in FIG. 12, a fuel cell separator (cathode separator) 11 according to Embodiment 10 of the present invention is identical in basic configuration to the fuel cell separator (cathode separator) 11 of Embodiment 8, but is different from the same in that the upstream end of the second specified portion of the first oxidizing gas channel 131 is an upstream end 53 (hereinafter referred to as a fourth portion 53) of a horizontally extending channel portion of the first downstream turn portion 31g, and the downstream end thereof is a downstream end of a channel portion of the third downstream turn portion 31k, which channel portion extends in the upward and downward direction.

The fuel cell including the fuel cell separator 11 according to Embodiment 10 configured as described above can achieve the function and advantages similar to those of the fuel cell 100 of Embodiment 8.

(Embodiment 11)

Figure 13:
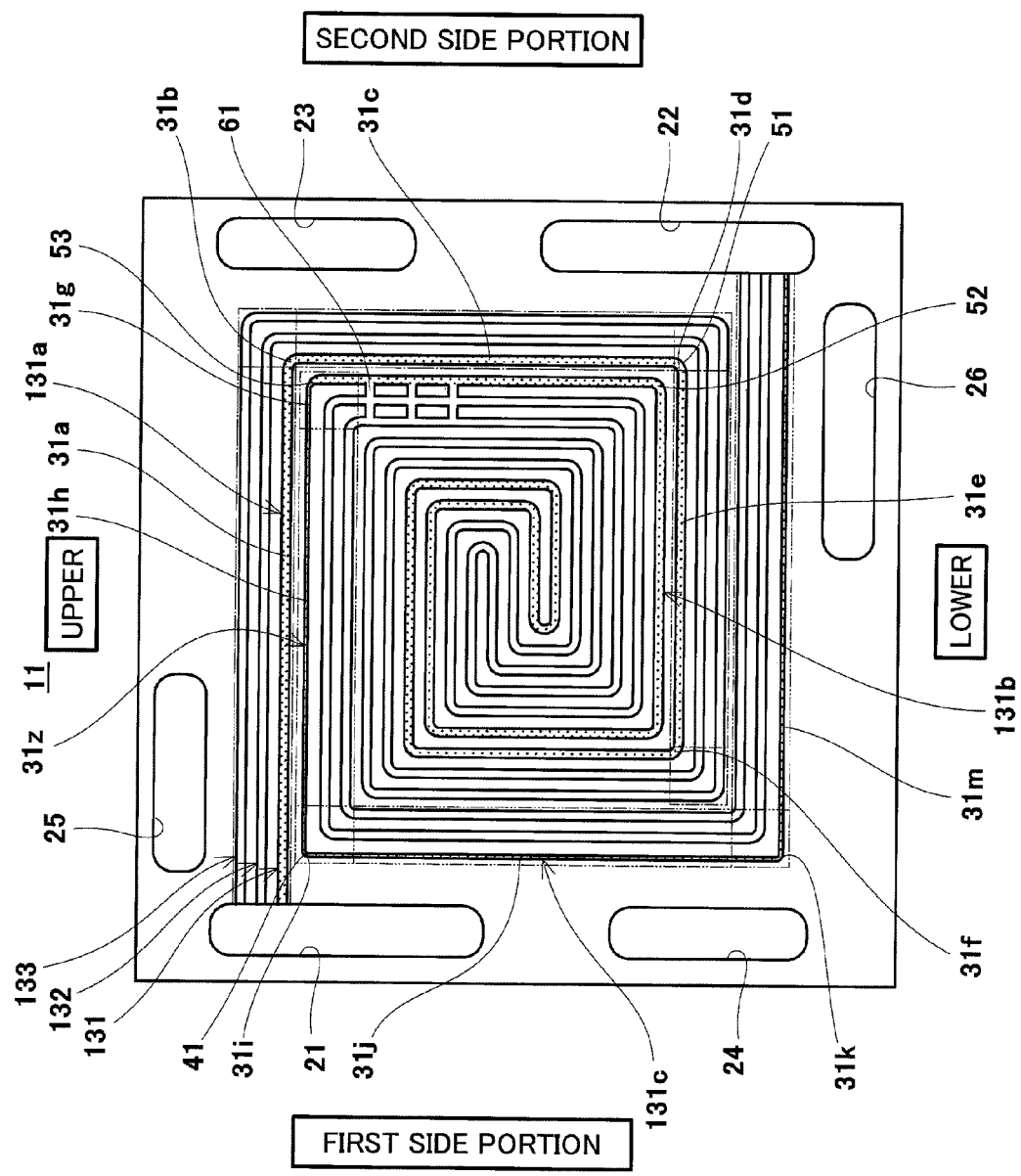
FIG. 13 is a schematic view showing a configuration of a fuel cell separator according to Embodiment 11 of the present invention.

FIG. 13 is a schematic view showing a configuration of a fuel cell separator according to Embodiment 11 of the present invention.

As shown in FIG. 13, a fuel cell separator (cathode separator) 11 according to Embodiment 11 is identical in basic configuration to the fuel cell separator (cathode separator) 11 of Embodiment 10, but is different from the same in that a plurality of (in this embodiment, three) communication channels 61 are provided at a region upstream of the second specified portion of the first oxidizing gas channel 131 such that the communication channels 61 are arranged at prescribed intervals to allow the first oxidizing gas channel 131, the second oxidizing gas channel 132 and the second oxidizing gas channel 133 to communicate with one another.

The fuel cell including the fuel cell separator 11 according to Embodiment 11 configured as described above can achieve the function and advantages similar to those of the fuel cell of Embodiment 10.

In accordance with the fuel cell including the fuel separator 11 according to Embodiment 11, the oxidizing gas flowing through the second oxidizing gas channels 132 and 133 flows through the communication channels 61. This allows the oxidizing gas supplied at the upstream end of the first oxidizing gas channel 131 and the upstream ends of the second oxidizing gas channels 132 and 133 to be divided to flow substantially uniformly in the first oxidizing gas channel 131 and the second oxidizing gas channels 132 and 133. Therefore, it is possible to reduce a variation in the amount of the oxidizing gas supplied to the first oxidizing gas channel 131 and the second oxidizing gas channels 132 and 133. As a result, the utilization efficiency of the oxidizing gas can be improved.

Although the communication channels 61 are provided to allow the first oxidizing gas channel 131, the second oxidizing gas channels 132 and 133 to communicate with one another in Embodiment 11, the present invention is not limited to this. A recess may be provided to allow the first oxidizing gas channel 131 and the second oxidizing gas channels 132 and 133 to communicate with one another, and a plurality of projections may be provided to extend vertically from the bottom surface of the recess. In such a configuration, the oxidizing gas flowing through the first oxidizing gas channel 131, the oxidizing gas flowing through the second oxidizing gas channel 132, and the oxidizing gas flowing through the second oxidizing gas channel 133 are joined at the recess. This makes it possible to reduce a variation in the amount of the oxidizing gas supplied at the upstream end of the first oxidizing gas channel 131 and at the upstream ends of the second oxidizing gas channels 132 and 133, and hence to improve the utilization efficiency of the oxidizing gas.

The flow of the oxidizing gas joined at the recess is disturbed and mixing of the joined oxidizing gas is facilitated because of the plurality of projections arranged in stripe shape at the recess. The mixed oxidizing gas is divided at the downstream end of the recess to flow through the first oxidizing gas channel 131 and the second oxidizing gas channels 132 and 133.

Although the communication channels 61 are provided to allow the first oxidizing gas channel 131 and the second oxidizing gas channels 132 and 133 to communicate with one another in Embodiment 11, the present invention is not limited to this. Alternatively, the communication channels 61 or the recess may be provided to provide communication only between the first oxidizing gas channel 131 and the second oxidizing gas channel 132.

In the configuration in which three or more second oxidizing gas channels are provided, the communication channels 61 may be configured as desired so long as the communication channels 61 are provided to allow communication between the first oxidizing gas channel 131 and at least the second oxidizing gas channel located closest to the first oxidizing gas channel 131, among the plurality of second oxidizing gas channels. For example, the communication channels 61 may be provided to provide communication between the first oxidizing gas channel 131 and the second oxidizing gas channels which are other than the second oxidizing gas channel located most distant from the first oxidizing gas channel 131.

(Embodiment 12)

Figure 14:
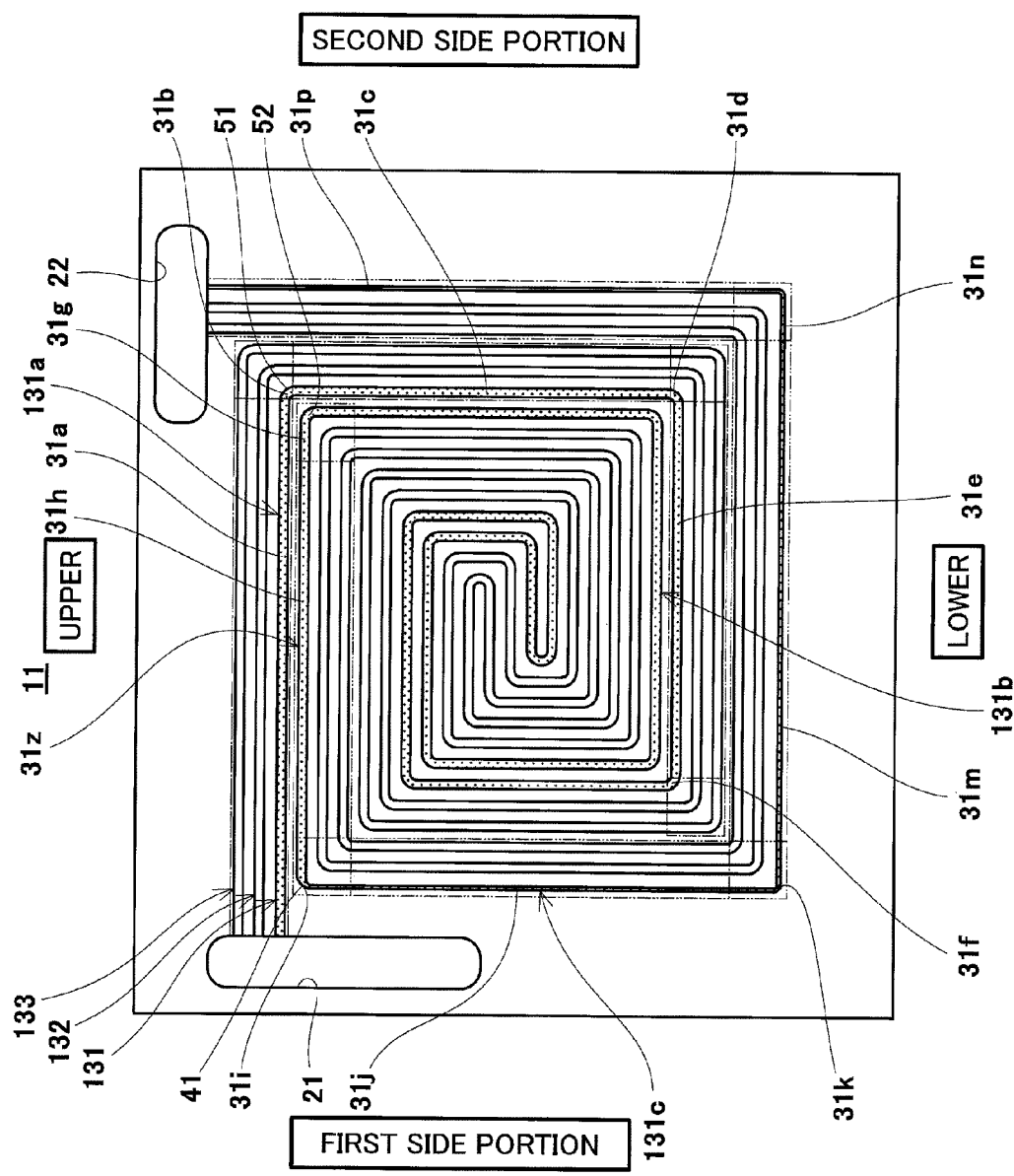
FIG. 14 is a schematic view showing a configuration of a fuel cell separator according to Embodiment 12 of the present invention.

FIG. 14 is a schematic view showing a configuration of a fuel cell separator according to Embodiment 12 of the present invention. In FIG. 14, only the oxidizing gas supply manifold hole 21 and the oxidizing gas discharge manifold hole 22 are illustrated and other manifold holes are not illustrated.

As shown in FIG. 14, a fuel cell separator (cathode separator) 11 according to Embodiment 12 is identical in basic configuration to the fuel cell separator (cathode separator) 11 of Embodiment 8, but is different from the same in the position of the oxidizing gas discharge manifold hole 22, the configuration of the downstream portion of the first oxidizing gas channel 131, and the configuration of the downstream portions of the second oxidizing gas channels 132 and 133.

To be specific, the oxidizing gas discharge manifold hole 22 is provided at the upper portion of the second side portion. The downstream portion 131*c* of the first oxidizing gas channel 131 is composed of the first downstream turn portion 31*g*, the first downstream linear portion 31*h*, the second downstream turn portion 31*i*, the second downstream linear portion 31*j*, the third downstream turn portion 31*k*, the third downstream linear portion 31*m*, the fourth downstream turn portion 31*n*, and a fourth downstream linear portion 31*p*. The portion of the downstream portion 131 from the upstream end to the third downstream linear portion 31*m* is configured similarly to the downstream portion 131*c* of the first oxidizing gas channel 131 of the cathode separator 11 of Embodiment 1. The downstream portion 131*c* of the first oxidizing gas channel 131 is configured in such a manner that the upstream end of the fourth downstream turn portion 31*n* which bends the direction of the channel portion from the horizontal direction to the vertical direction is connected to the downstream end of the third downstream linear portion 31*m*, the upstream end of the fourth downstream linear portion 31*p* vertically upwardly extending is connected to the downstream end of the fourth downstream turn portion 31*n*, and the downstream end of the fourth downstream linear portion 31*p* is connected to the oxidizing gas discharge manifold hole 22.

Since the second oxidizing gas channels 132 and 133 are configured similarly to the first oxidizing gas channel 131, they will not be described repetitively. Since the downstream portion 131*c* of the first oxidizing gas channel 131 is configured as described above, the second portion 51 located closest to the downstream end of the first oxidizing gas channel 131, in the portion of the first oxidizing gas channel 131 which lies between the upstream end thereof and the first portion 41 thereof, is the first upstream turn portion 31*b* in the upstream portion 131*a*. The third portion 52 located closest to the second portion 51, in the portion of the main surface of the cathode separator 11, which is located inward relative to the second portion 51, is an upstream end of the horizontally extending channel portion of the first downstream turn portion 31*g*.

The fuel cell including the fuel cell separator 11 according to Embodiment 12 configured as described above can achieve the function and advantages similar to those of the fuel cell 100 of Embodiment 8.

(Embodiment 13)

Figure 15:
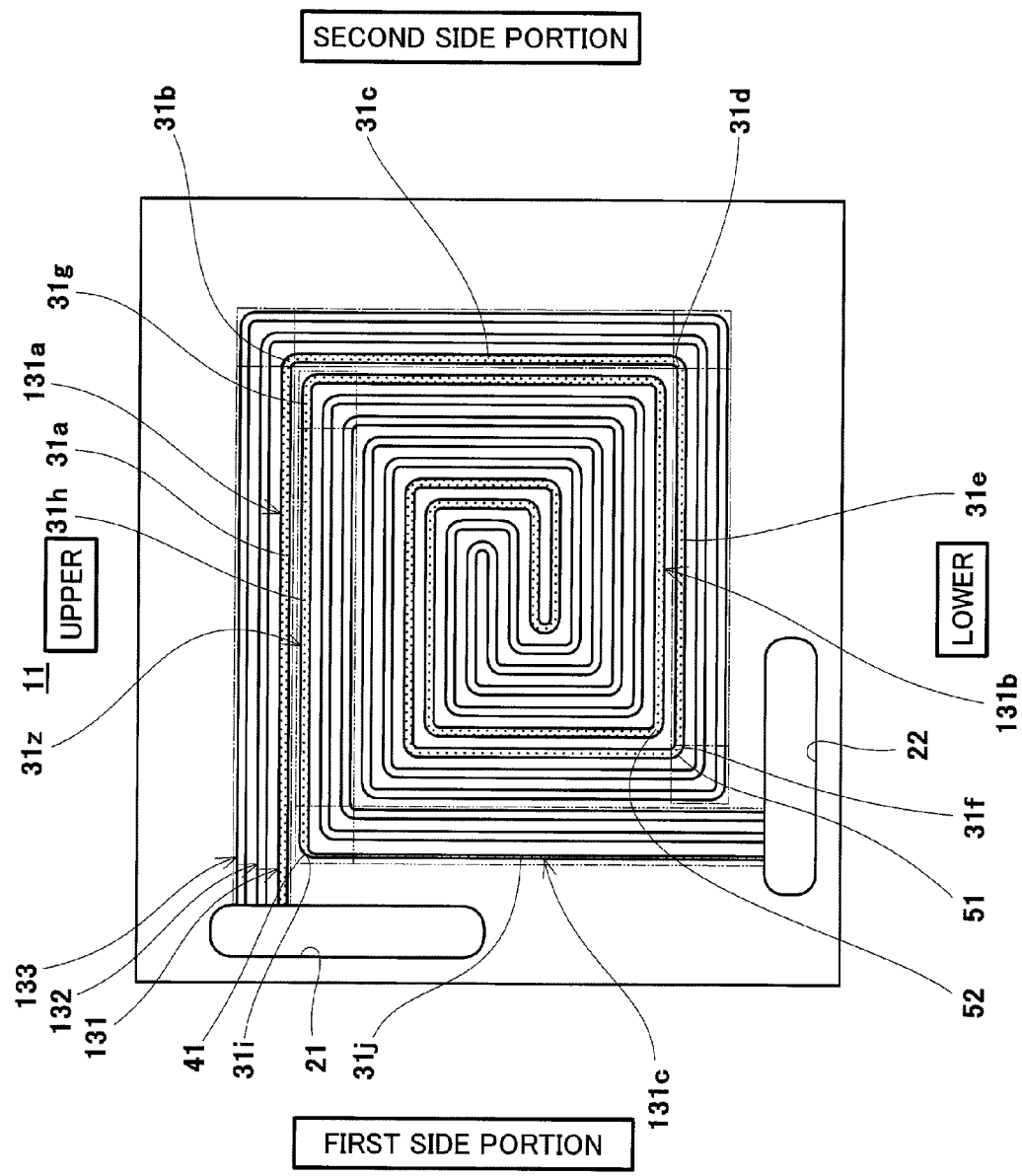
FIG. 15 is a schematic view showing a configuration of a fuel cell separator according to Embodiment 13 of the present invention.

FIG. 15 is a schematic view showing a configuration of a fuel cell separator according to Embodiment 13 of the present invention. In FIG. 15, only the oxidizing gas supply manifold hole 21 and the oxidizing gas discharge manifold hole 22 are illustrated and other manifold holes are not illustrated.

As shown in FIG. 15, a fuel cell separator (cathode separator) 11 according to Embodiment 13 is identical in basic configuration to the fuel cell separator (cathode separator) 11 of Embodiment 8, but is different from the same in the position of the oxidizing gas discharge manifold hole 22, the configuration of the downstream portion of the first oxidizing gas channel 131 and the configuration of the downstream portions of the second oxidizing gas channels 132 and 133.

To be specific, the oxidizing gas discharge manifold hole 22 is provided at the lower portion of the first side portion. The downstream portion 131*c* of the first oxidizing gas channel 131 has a substantially-L shape and is composed of the first downstream turn portion 31*g*, the first downstream linear portion 31*h*, the second downstream turn portion 31*i*, and the second downstream linear portion 31*j*.

Since the second oxidizing gas channels 132 and 133 are configured similarly to the first oxidizing gas channel 131, they will not be described repetitively. Since the upstream portion 131*a* of the first oxidizing gas channel 131 is configured as described above, the second portion 51 located closest to the downstream end of the first oxidizing gas channel 131, in the portion of the first oxidizing gas channel 131 which lies between the upstream end thereof and the first portion 41 thereof, is the third upstream turn portion 31*f* of the upstream portion 131*a*. The third portion 52 is a terminal end of the portion extending downward from the downstream end of the midstream portion 131*b* and then horizontally extending toward the first side portion.

The fuel cell including the fuel cell separator 11 according to Embodiment 13 configured as described above can achieve the function and advantages similar to those of the fuel cell 100 of Embodiment 8.

(Embodiment 14)

Figure 16:
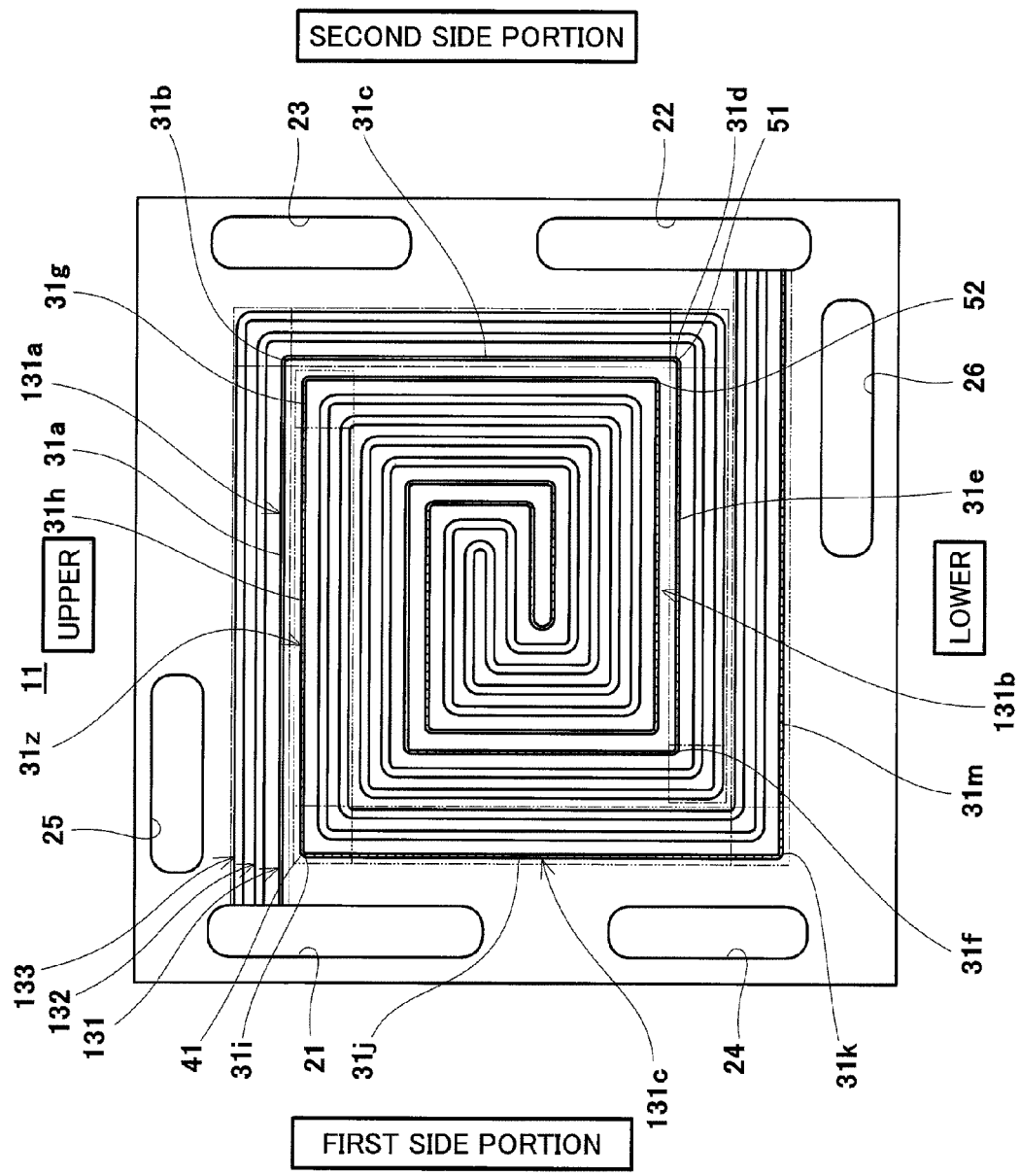
FIG. 16 is a schematic view showing a configuration of a fuel cell separator according to Embodiment 14 of the present invention.

FIG. 16 is a schematic view showing a configuration of a fuel cell separator according to Embodiment 14 of the present invention.

As shown in FIG. 16, a fuel cell separator (cathode separator) 11 according to Embodiment 14 is identical in basic configuration to the fuel cell separator (cathode separator) 11 of Embodiment 8, but is different from the same in that cross-sectional area of the entire of the first oxidizing gas channel 131 is smaller than the cross-sectional areas of the second oxidizing gas channels 132 and 133. To be specific, the first oxidizing gas channel 131 of the fuel cell separator 11 of Embodiment 14 is configured such that the portion of the first oxidizing gas channel 131 which is other than the second specified portion (portion from the first portion 41 to the downstream end of the first oxidizing gas channel 131) is made substantially equal to that of the second specified portion.

In the fuel cell including the fuel cell separator 11 according to Embodiment 14 configured as described above, the flow rate of the oxidizing gas flowing through the first upstream linear portion 31a of the first oxidizing gas channel 131 is lessened, it is possible to reduce the amount of the oxidizing gas which will flow into (shortcut to) the channel portion 31z (especially first portion 41) closest to the first upstream linear portion 31a of the first oxidizing gas channel 131 via the cathode gas diffusion layer 3b.

(Embodiment 15)

Figure 17:
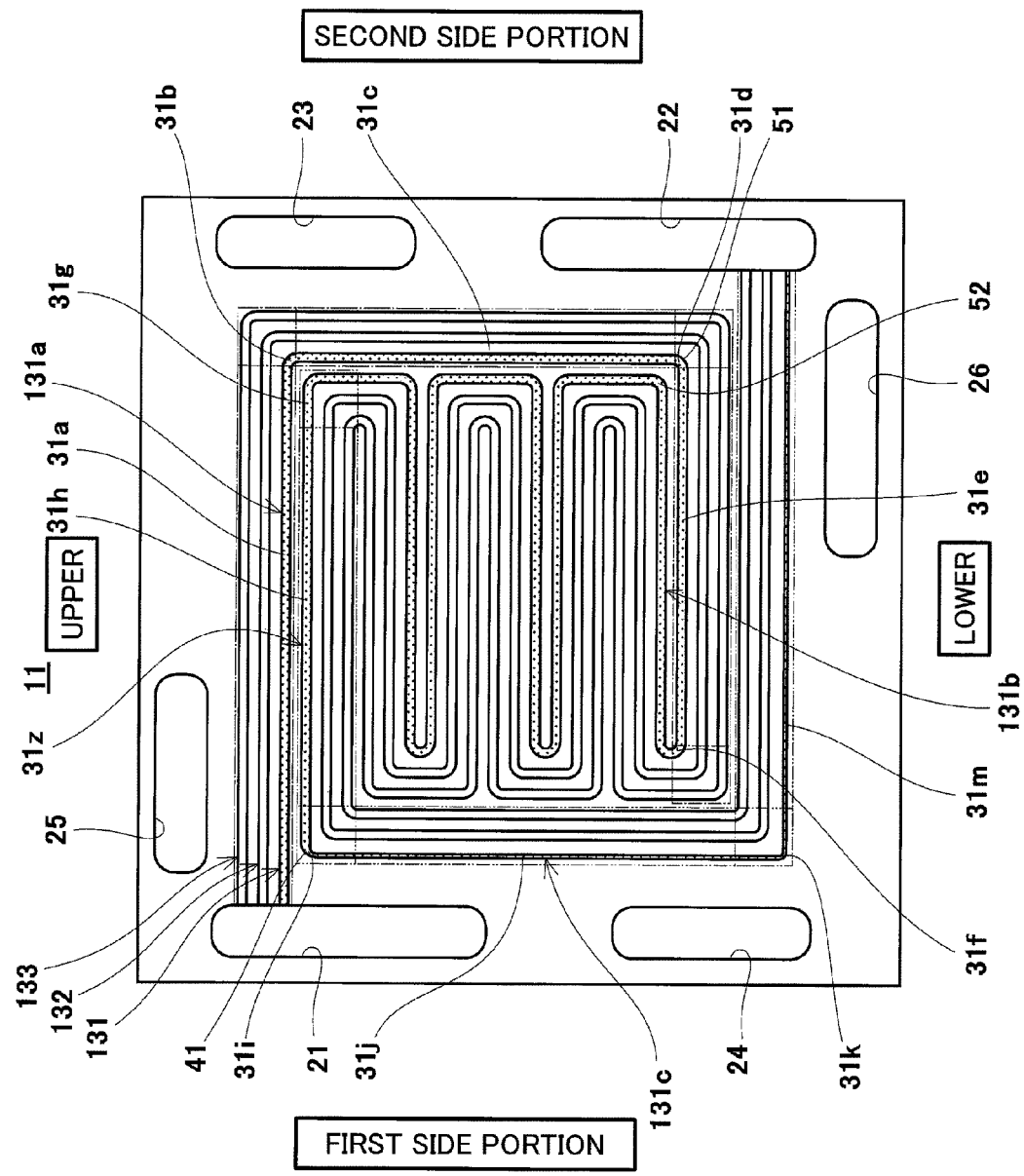
FIG. 17 is a schematic view showing a configuration of a fuel cell separator according to Embodiment 15 of the present invention.

FIG. 17 is a schematic view showing a configuration of a fuel cell separator according to Embodiment 15 of the present invention.

As shown in FIG. 17, a fuel cell separator (cathode separator) 11 according to Embodiment 15 is identical in basic configuration to the fuel cell separator (cathode separator) 11 of Embodiment 8, but is different from the same in that the midstream portion of the first oxidizing gas channel 131 and the midstream portions of the second oxidizing gas channels 132 and 133 have a serpentine shape. Hereinafter, the configuration of the midstream portion 131b of the first oxidizing gas channel 131 will be described.

The midstream portion 131b of the first oxidizing gas channel 131 is configured such that its channel portion extends in the upward direction from the downstream end of the upstream portion 131a, then turns 180 degrees, then horizontally extends a certain distance in the second lateral direction, then extends a certain distance in the upward direction, and then horizontally extends a certain distance in the first lateral direction. After this extension pattern is repeated once, the channel portion extends in the upward direction, then turns 180 degrees, then horizontally extends a certain distance in the second lateral direction, and then extends a certain distance in the upward direction to reach the upstream end of the downstream portion 131c.

The fuel cell including the fuel cell separator 11 according to Embodiment 15 configured as described above can achieve the function and advantages similar to those of the fuel cell 100 of Embodiment 8.

(Embodiment 16)

Figure 18:
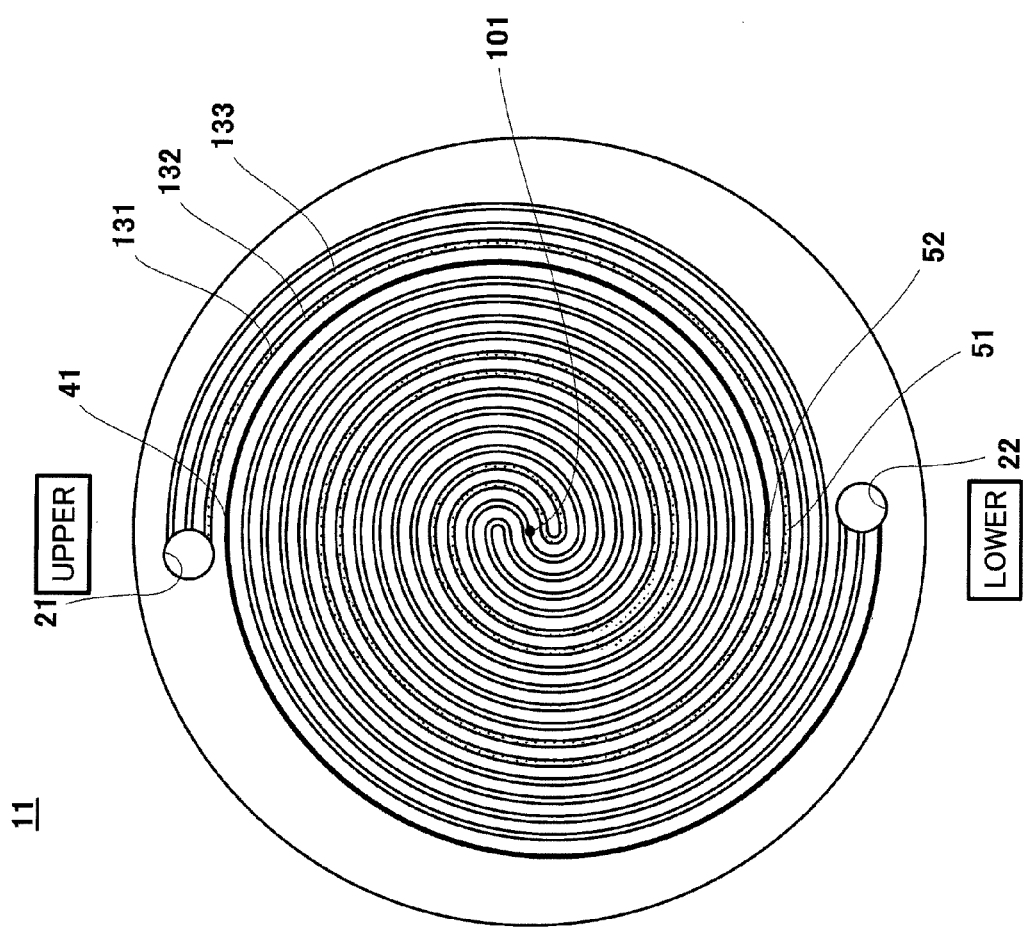
FIG. 18 is a schematic view showing a configuration of a fuel cell separator according to Embodiment 16 of the present invention.

FIG. 18 is a schematic view showing a configuration of a fuel cell separator according to Embodiment 16 of the present invention. In FIG. 18, only the oxidizing gas supply manifold hole 21 and oxidizing gas discharge manifold hole 22 are illustrated and other manifold holes are not illustrated.

As shown in FIG. 18, the fuel cell separator (cathode separator) 11 according to Embodiment 16 has a disc-shape and is provided on a main surface thereof with the first oxidizing gas channel 131 and the two second oxidizing gas channels such that these channels run along one another. The oxidizing gas supply manifold hole 21 and the oxidizing gas discharge manifold hole 22 are arranged opposite to each other to sandwich the center portion (center axis 101) of the cathode separator 11. Although the oxidizing gas supply manifold hole 21 and the oxidizing gas discharge manifold hole 22 are arranged opposite to each other to sandwich the center portion of the cathode separator 11, the present invention is not limited to this. These manifold holes may be positioned anywhere in the peripheral region of the cathode separator 11.

The first oxidizing gas channel 131 and the second oxidizing gas channels 132 and 133 entirely have a spiral shape. To be specific, the channels extend clockwise in a circular-arc shape such that the channels extending from the upstream ends converge toward the center portion of the cathode separator 11, turn back at the center portion of the cathode separator 11 and extend counterclockwise in a circular-arc shape such that they diverge toward the peripheral region of the cathode separator 11.

The first oxidizing gas channel 131 includes the first portion 41 and the second portion 51. As described above, the first portion is located closest to the upstream end of the first oxidizing gas channel 131, in the portion of the first oxidizing gas channel 131 which lies between the downstream end thereof and the second portion 51 thereof. In this embodiment, the first portion 41 is constituted by a portion located closest to the outer periphery of the separator 11, in the portion of the first oxidizing gas channel 131, which portion intersects a line connecting the upstream end of the first oxidizing gas channel 131 to the center axis 101. The second portion 51 is located closest to the downstream end of the first oxidizing gas channel 131, in the portion of the first oxidizing gas channel 131 which lies between the first portion 41 thereof and the upstream end thereof. In this embodiment, the second portion 51 is constituted by a portion located closest to the outer periphery of the separator 11, in the portion of the first oxidizing gas channel 131, which portion intersects a line connecting the downstream end of the first oxidizing gas channel 131 to the center axis 101. The third portion 52 is located closest to the second portion 51, in a portion of the first oxidizing gas channel 131 on the main surface of the cathode separator 11, which is located inward relative to the second portion 51. In this embodiment, the third portion 52 is constituted by the portion of the first oxidizing gas channel 131 which is located inward relative to the second portion 51, in a portion of the first oxidizing gas channel 131, which portion intersects a line connecting the downstream end of the first oxidizing gas channel 131 to the center axis 101.

The second specified portion of the first oxidizing gas channel 131 is constituted by the portion of the first oxidizing gas channel 131 from the third portion 52 to the downstream end of the first oxidizing gas channel 131.

The fuel cell including the fuel cell separator 11 according to Embodiment 16 configured as described above can achieve the function and advantages similar to those of the fuel cell 100 of Embodiment 8.

Thus, the embodiments of the present invention have been described in detail, but the present invention is not limited to the above described embodiments.

For example, although in the above described Embodiments 1~7 of the present invention, the width of the channel portion of the first specified portion of the first oxidizing gas channel 131 is made smaller than the width of the portion of the first oxidizing gas channel 131 which is other than the first specified portion and the widths of the second oxidizing gas channels 132 and 133, to make the cross-sectional area of the first specified portion of the first oxidizing gas channel 131 smaller than the cross-sectional area of the portion of the first oxidizing gas channel 131 which is other than the first specified portion and the cross-sectional areas of the second oxidizing gas channels 132 and 133, the present invention is not limited to this. For example, the depth of the channel portion of the first specified portion of the first oxidizing gas channel 131 may be made smaller than the depth of the channel portion of the portion of the first oxidizing gas channel 131 which is other than the first specified portion and the depths of second oxidizing gas channels 132 and 133.

Although in the above Embodiments 1~7, the second oxidizing gas channels 132 and 133 are configured to have an equal cross-sectional area, the present invention is not limited to this. For example, the second oxidizing gas channels 132 and 133 may be configured to have different cross-sectional areas. The cross-sectional area of a part of the specified second oxidizing gas channel may be made smaller than the cross-sectional area of the first specified portion of the first oxidizing gas channel 131, or the cross-sectional area of a part of the portion of the first oxidizing gas channel 131 which is other than the first specified portion may be made smaller than the cross-sectional area of the first specified portion, so long as the function and advantages of the present invention are achieved.

Furthermore, a part of the first specified portion of the first oxidizing gas channel 131 may be made larger than the cross-sectional area of the specified second oxidizing gas channel. For example, the cross-sectional area of the channel portion of a portion of the first oxidizing gas channel 131, extending from the upstream end of the first specified portion to a portion of the first specified portion which overlaps with the end of the catalyst layer (cathode catalyst layer 2b and/or anode catalyst layer 2a), when viewed in the thickness direction of the fuel cell separator 11, is made larger than the cross-sectional area of the specified second oxidizing gas channel, and the cross-sectional area of the channel portion from the portion of the first specified portion which overlaps with the end of the catalyst layer to the downstream end of the first specified portion may be made smaller than the cross-sectional area of the specified second oxidizing gas channel.

Although in the above described Embodiments 8~16 of the present invention, for example, the width of the channel portion of the second specified portion of the first oxidizing gas channel 131 is made smaller than the width of the channel portion of the portion of the first oxidizing gas channel 131 which is other than the second specified portion and the widths of the second oxidizing gas channels 132 and 133, to make the cross-sectional area of the second specified portion of the first oxidizing gas channel 131 smaller than the cross-sectional area of the portion of the first oxidizing gas channel 131 which is other than the second specified portion and the cross-sectional areas of the second oxidizing gas channels 132 and 133, the present invention is not limited to this. The depth of the channel portion of the second specified portion of the first oxidizing gas channel 131 may be made smaller than the depth of the channel portion of the portion of the first oxidizing gas channel 131 which is other than the second specified portion and the depths of the second oxidizing gas channels 132 and 133.

Although in the above Embodiments 8~16, the second oxidizing gas channels 132 and 133 are configured to have an equal cross-sectional area, the present invention is not limited to this, but the second oxidizing gas channels 132 and 133 may be configured to have different cross-sectional areas. The cross-sectional area of a part of the specified second oxidizing gas channel may be made smaller than the cross-sectional area of the second specified portion of the first oxidizing gas channel 131, or the cross-sectional area of a part of the portion of the first oxidizing gas channel 131 which is other than the second specified portion may be made smaller than the cross-sectional area of the second specified portion, so long as the function and advantage of the present invention are achieved.

Furthermore, the cross-sectional area of a part of the second specified portion of the first oxidizing gas channel 131 may be made larger than the cross-sectional area of the specified second oxidizing gas channel so long as the function and advantage of the present invention are achieved. For example, the cross-sectional area of the channel portion of a portion of the first oxidizing gas channel 131 extending from the upstream end of the second specified portion to a portion of the second specified portion which overlaps with the end of the catalyst layer (cathode catalyst layer 2b and/or the anode catalyst layer 2a) when viewed in the thickness direction of the fuel cell separator 11 may be made smaller than the cross-sectional area of the specified second oxidizing gas channel, and the cross-sectional area of the channel portion of the portion of the second specified portion which overlaps with the end of the catalyst layer to the downstream end of the second specified portion may be made larger than the cross-sectional area of the specified second oxidizing gas channel.

REFERENCE EXAMPLE

Next, Reference Example of the present invention will be described with reference to FIG. 19.

Figure 19:
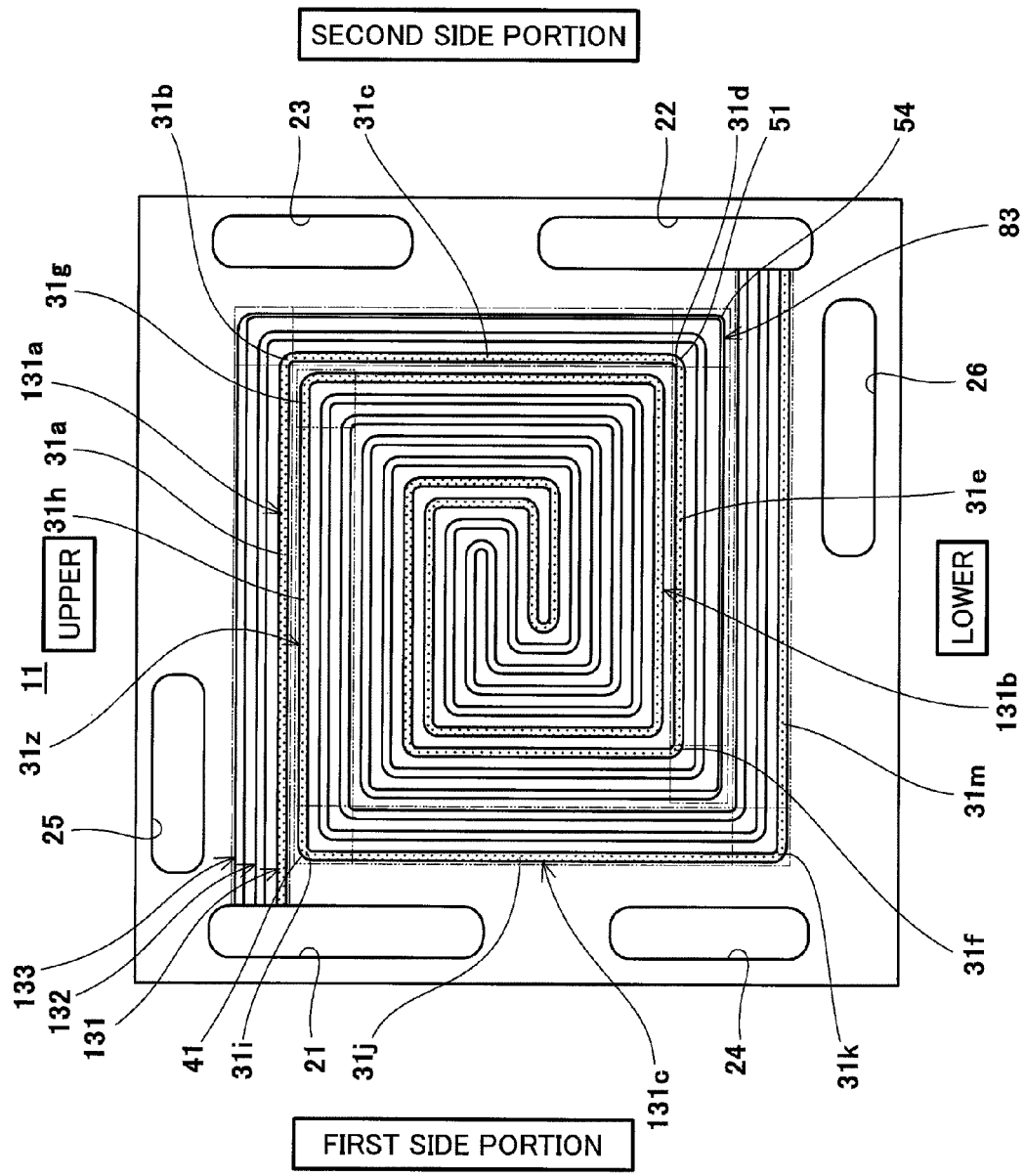
FIG. 19 is a schematic view showing a configuration of a fuel cell separator according to Reference Example of the present invention.

FIG. 19 is a schematic view showing a configuration of a fuel cell separator according to Reference Example of the present invention.

As shown in FIG. 19, the fuel cell separator 11 of Reference Example of the present invention is configured such that the cross-sectional area of the channel portion of a part of the second oxidizing gas channel 133(hereinafter referred to as third oxidizing gas channel 133) located most distant from the first oxidizing gas channel 131, among the second oxidizing gas channels 132 and 133, is made smaller than the cross-sectional areas of the other channels, unlike the present invention. Hereinafter, the portions of the third oxidizing gas channel 133, corresponding to those of the first oxidizing gas channel 131 are designated by the same reference numerals (e.g., the portion of the third oxidizing gas channel 133, corresponding to the first upstream linear portion 31a of the first oxidizing gas channel 131 is expressed as the first upstream linear portion 31a of the third oxidizing gas channel 133).

To be specific, the third oxidizing gas channel 133 includes a fifth portion 54 corresponding to the second portion 51 of the first oxidizing gas channel 131. The third oxidizing gas channel 133 is configured such that the cross-sectional area of the channel portion of a continuous portion (hereinafter referred to as third specified portion 83) including the fifth portion 54 is made smaller than the cross-sectional area of the first oxidizing gas channel 131 and the cross-sectional area of the second oxidizing gas channel 132. To be more specific, the third specified portion 83 is configured such that the cross-sectional areas of the channel portion extending in the upward and downward direction in the first upstream turn portion 31b, the channel portion of the second upstream linear portion 31c, the channel portion of the second upstream turn portion 31d, the channel portion of the third upstream linear portion 31e and the horizontally extending channel portion of the third upstream turn portion 31f, in the third oxidizing gas channel 133, are smaller than the cross-sectional areas of the first oxidizing gas channel 131 and the second oxidizing gas channel 132.

Because of the pressure difference generated between the oxidizing gas flowing through the third specified portion 83 (especially fifth portion 54) of the third oxidizing gas channel 133 and the oxidizing gas flowing through the third downstream linear portion 31m located closest to the third specified portion 83 in the downstream portion 131 of the third oxidizing gas channel 133, a part of the oxidizing gas flowing through the upstream portion 131a flows into the downstream portion 131c (especially, third downstream linear portion 31m) of the third oxidizing gas channel 133 via the cathode gas diffusion layer 3b.

Since the oxidizing gas flowing through the upstream portion 131a of the third oxidizing gas channel 133 shortcuts, a pressure difference is generated between the oxidizing gas flowing through the upstream portion of the first oxidizing gas channel 131 and the upstream portion of the second oxidizing gas channel 132, and the oxidizing gas flowing through the upstream portion 131a of the third oxidizing gas channel 133. Because of this pressure difference, a part of the oxidizing gas flowing through the upstream portions of the first oxidizing gas channel 131 and the second oxidizing gas channel 132, flows into the upstream portion 131a of the third oxidizing gas channel 133. Then, a part of the oxidizing gas which has flowed from the first oxidizing gas channel 131 and the second oxidizing gas channel 132 into the third oxidizing gas channel 133 flows into the third specified portion 83 (especially fifth portion 53 of the third oxidizing gas channel 133) of the third oxidizing gas channel 133. As a whole, a part of the oxidizing gas flowing through the first oxidizing gas channel 131, the second oxidizing gas channel 132 and the third oxidizing gas channel 133 flows into the downstream portion 131c (especially third downstream linear portion 31m) of the third oxidizing gas channel 133.

Since a part of the oxidizing gas flowing through the first oxidizing gas channel 131, the second oxidizing gas channels 132 and the third oxidizing gas channel 133 shortcuts to the downstream portion 131c (especially third downstream linear portion 31m) of the third oxidizing gas channel 133, such a gas is discharged into the oxidizing gas discharge manifold hole 22 without being consumed in the reaction, thereby resulting in a reduced utilization efficiency of the reactant gas.

However, the cross-sectional area of the channel portion of the third specified portion 83 of the third oxidizing gas channel 133 is made smaller than the cross-sectional area of the portion of the third oxidizing gas channel 133 which is other than the third specified portion 83 and the cross-sectional areas of the first oxidizing gas channel 131 and the second oxidizing gas channel 132. In this structure, since the flow rate of the oxidizing gas flowing through the third specified portion 83 of the third oxidizing gas channel 133 is lessened, it is possible to reduce the amount of oxidizing gas flowing (shortcutting) to the downstream portion 131c (especially third downstream linear portion 31m) of the third oxidizing gas channel 131 via the cathode gas diffusion layer 3b.

Therefore, it is possible to reduce the amount of the oxidizing gas which will be discharged from the oxidizing gas supply manifold hole 22 without being consumed in the reaction with the fuel gas, in the oxidizing gas flowing through the first to third oxidizing gas channels 131 to 133. As a result, a utilization efficiency of the reactant gas can be improved.

Next, Examples will be described.

EXAMPLES

Test Example 1

Figure 20:
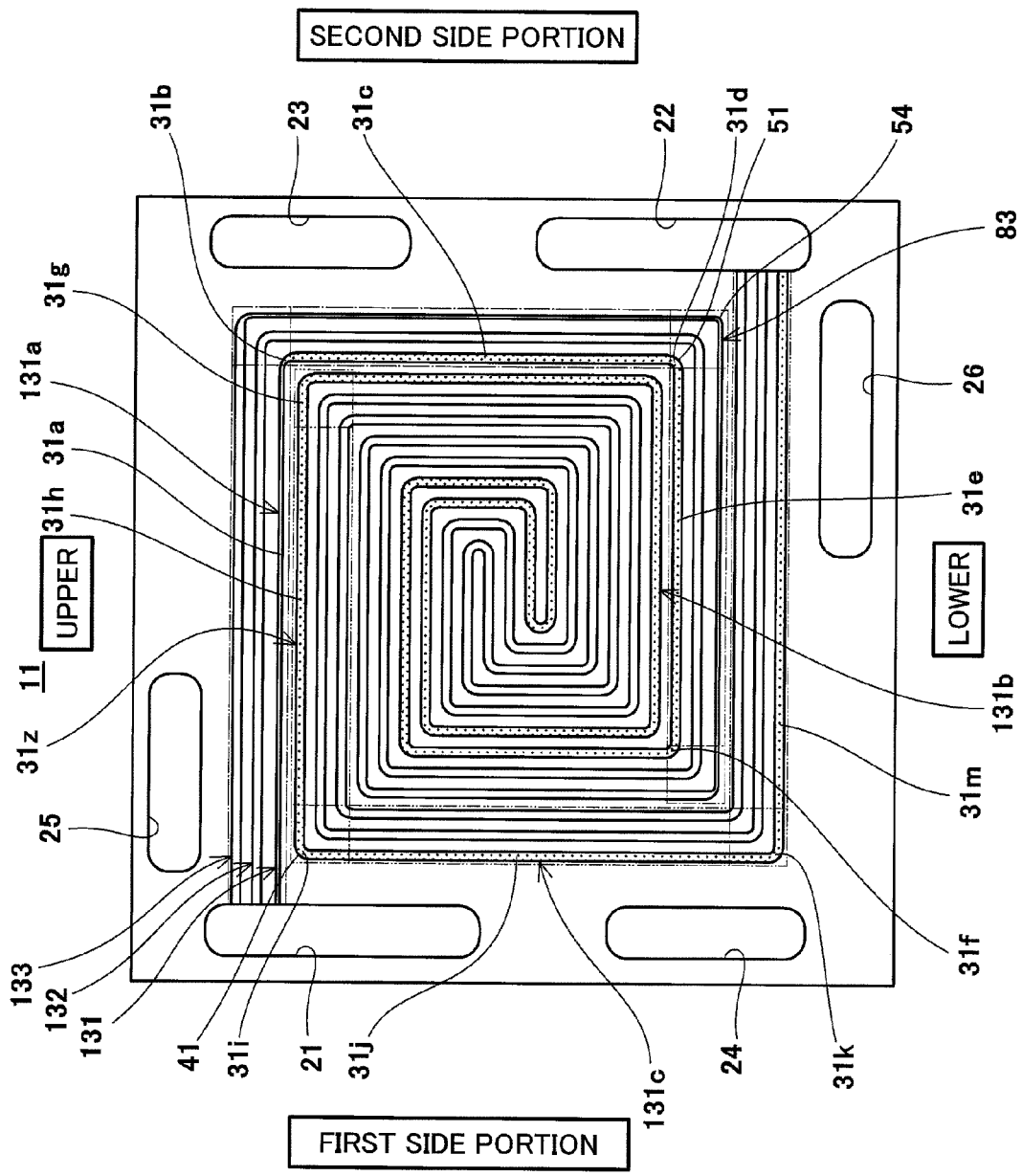
FIG. 20 is a schematic view showing a configuration of a fuel cell separator used in Example 1 of Test Example 1.

FIG. 20 is a schematic view showing a configuration of a fuel cell separator used in Example 1 of Test Example 1.

Figure 9:
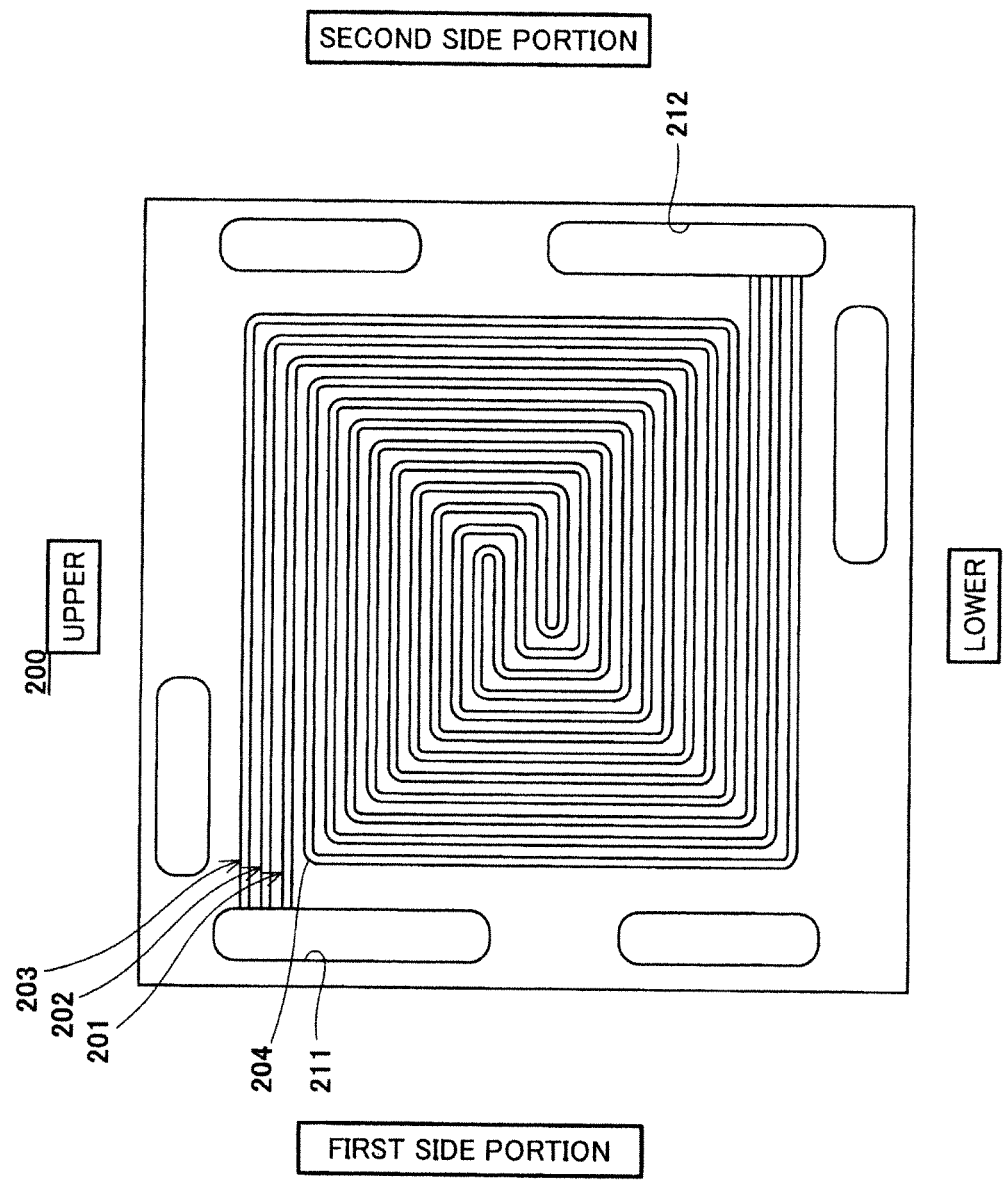
FIG. 9 is a schematic view showing a configuration of a main surface of a separator of a fuel cell disclosed in Patent literature 1.

As shown in FIG. 20, the cathode separator 11 of Example 1 was configured to include the first oxidizing gas channel 131 and five second oxidizing gas channels 132 of Embodiment 1 of the present invention, and the oxidizing gas channel 133 of Reference Example of the present invention. In FIG. 20, the five second oxidizing gas channels 132 are expressed as a single channel. The cathode separator 11 of Example 2 was configured to include five second oxidizing gas channels of the fuel cell separator 11 according to Embodiment 9, while the cathode separator 11 of Comparative Example was configured to include seven fluid channels of the conventional fuel cell separator shown in FIG. 9. The anode separators 10 of Examples 1 and 2 and Comparative Example were each configured to include three fuel gas channels formed in a serpentine shape. Using the separators 10 and 11, cells were fabricated and used as Test Example 1.

In Test Example 1, power generation conditions were such that a current density was 0.16 A/cm$^2$, a fuel utilization rate was 75%, a gas mixture of 75% of hydrogen and 25% of carbon dioxide was used as a fuel gas, air was used as the oxidizing gas, a dew point of the fuel gas was set to 65 degrees C. and a dew point of the oxidizing gas was set to 35 degrees C., a cell temperature was set to 90 degrees C., and an oxygen utilization rate was varied from 55 to 90%, and under this condition, cell voltages of the cells were measured. The result is shown in FIG. 21.

Figures 21, 22:
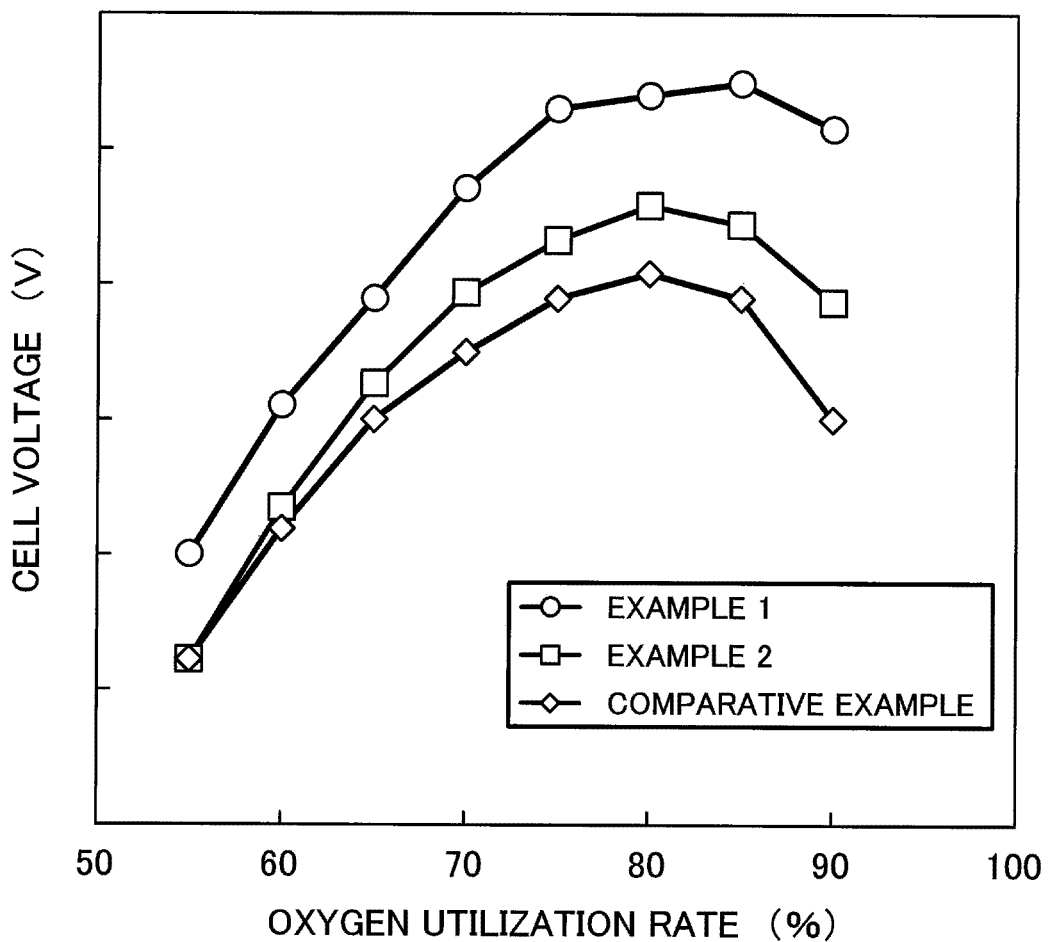
FIG. 21 is a graph showing a cell voltage measurement result of Test Example 1.
FIG. 22 is a table showing result of simulation analysis of Test Example 2.

FIG. 21 is a graph showing a cell voltage measurement result of Test Example 1.

As shown in 21, in the cells of Example 1 and Example 2, the cell voltage was higher than the cell voltage of the cell in Comparative Example. In particular, when the oxygen utilization rate was 80%, the voltage of the cell of Example 1 was 13 mV higher than the voltage of the cell of Comparative Example and the voltage of the cell of Example 2 was 5 mV higher than the voltage of the cell of Comparative Example.

Test Example 2

In Test Example 2, the advantage achieved by the fuel cell separator 11 of the present invention and the fuel cell (single cell) 100 including the fuel cell separator 11 was verified by simulation analysis. For the purpose of simple evaluation, only an electrode surface was analyzed.

In Example 3, the first oxidizing gas channel 131 and the second oxidizing gas channels 132 and 133 of the fuel cell separator 11 of Embodiment 1 were used, while in Example 4, the first oxidizing gas channel 131 and the second oxidizing gas channels 132 and 133 of the fuel cell separator 11 of Embodiment 9 were used. In Comparative Example, the fluid channels 201~203 of the conventional fuel cell separator of FIG. 9 were used.

In analysis, FLUENT, PEM module manufactured by ANSYS JAPAN Co., Ltd. was used. Power generation conditions were such that a current density was 0.16 A/cm$^2$, a fuel utilization rate was 75%, an oxygen utilization rate was 55%, a gas mixture of 75% of hydrogen and 25% of carbon dioxide was used as the fuel gas, air was used as the oxidizing gas, a dew point of the fuel gas was set to 65 degrees C., a dew point of the oxidizing gas was set to 35 degrees C., and a cell temperature was set to 90 degrees C. The result is shown in FIG. 22.

FIG. 22 is a table showing a result of simulation analysis of Test Example 2.

As shown in FIG. 22, membrane resistance was 1.941m Q in Example 3, membrane resistance was 1.969 mΩ in Example 4, and 1.984 mΩ in Comparative Example.

From the above results, in the fuel cell separator 11 of the present invention and the fuel cell 100 including the fuel cell separator 11, it is presumed that since the reactant gas flowing through the reactant gas channel is suppressed from being discharged without being consumed in the reaction, water retainability within the cell was improved, and the membrane resistance was reduced. Also, it was suggested that cell performance can be improved, by suppressing the reactant gas flowing through the reactant gas channel from being discharged without being consumed in the reaction and improving the utilization efficiency of the reactant gas.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

Industrial Applicability

A fuel cell separator of the present invention and a fuel cell including the fuel cell separator are capable of suppressing a reactant gas flowing through a reactant gas channel from being discharged without being consumed in a reaction, and improving a utilization efficiency of the reactant gas, and enable efficient power generation. Therefore, the fuel cell separator and the fuel cell are useful in a technical field of fuel cells.

Reference Signs List 1 polymer electrolyte membrane
2a anode catalyst layer
2b cathode catalyst layer
3a anode gas diffusion layer
3b cathode gas diffusion layer
4a anode
4b cathode
5 MEA (Membrane-Electrode-Assembly)
6 gasket
9 cooling medium channel
10 anode separator
11 cathode separator
21 oxidizing gas supply manifold hole (reactant gas supply manifold hole)
22 oxidizing gas discharge manifold hole (reactant gas discharge manifold hole)
23 fuel gas supply manifold hole (reactant gas supply manifold hole)
24 fuel gas discharge manifold hole (reactant gas discharge manifold hole)
25 cooling medium supply manifold hole
26 cooling medium discharge manifold hole
31a first upstream linear portion
31b first upstream turn portion
31c second upstream linear portion
31d second upstream turn portion
31e third upstream linear portion
31f third upstream turn portion
31g first downstream turn portion
31h first downstream linear portion
31i second downstream turn portion
31j second downstream linear portion
31k third downstream turn portion
31m third downstream linear portion
31n fourth downstream turn portion
31p fourth downstream linear portion
31z channel portion
41 first portion
51 second portion
52 third portion
53 fourth portion
54 fifth portion
61 communication channels
83 third specified portion
100 fuel cell
131 first oxidizing gas channel (first reactant gas channel)
131a upstream portion
131b midstream portion
131c downstream portion
132 second oxidizing gas channel (second reactant gas channel)
133 second oxidizing gas channel (second reactant gas channel)
141 first fuel gas channel (first reactant gas channel)
142 second fuel gas channel (second reactant gas channel)
143 second fuel gas channel (second reactant gas channel)
200 separator
201 fluid channel
202 fluid channel
203 fluid channel
211 inlet
212 outlet

The invention claimed is:

1. A fuel cell separator comprising:
a reactant gas supply manifold hole penetrating the separator in a thickness direction thereof;
a reactant gas discharge manifold hole penetrating the separator in the thickness direction thereof;
a groove-shaped first reactant gas channel provided on at least one main surface thereof such that the first reactant gas channel is bent, an upstream end of the first reactant gas channel is connected to the reactant gas supply manifold hole, and a downstream end of the first reactant gas channel is connected to the reactant gas discharge manifold hole; and
one or more groove-shaped second reactant gas channels provided on the at least one main surface such that the second reactant gas channels are bent, at least upstream ends of the second reactant gas channels are connected to the reactant gas supply manifold hole, and the second reactant gas channels run along the first reactant gas channel,
wherein the first reactant gas channel includes an upstream portion, a midstream portion and a downstream portion, and the upstream portion and the downstream portion surround the midstream portion, in a plan view of the separator,
wherein the first reactant gas channel includes a first portion and a second portion located upstream of the first portion, the first portion is located closest to the upstream end in the downstream portion of the first reactant gas view of the separator, and the second portion is located closest to the downstream end in the upstream portion of the first reactant gas channel, in a plan view of the separator,
wherein the second reactant gas channel does not exist between the first portion and the upstream end, but exists between the downstream end and the second portion, and
wherein at least one of a cross-sectional area of at least a continuous portion (hereinafter referred to as a first specified portion) of the first reactant gas channel, the continuous portion extending from the upstream end, and a cross-sectional area of at least a portion (hereinafter referred to as a second specified portion) of the first reactant gas channel, the portion being located downstream of the first portion is smaller than a cross-sectional area of all portions of at least one second reactant gas channel (hereinafter referred to as specified second reactant gas channel) of the one or more second reactant gas channels.

2. The fuel cell separator according to claim 1, wherein a width of a channel portion of the at least one of the first specified portion and the second specified portion of the first reactant gas channel is smaller than a width of the specified second reactant gas channel.

3. The fuel cell separator according to claim 1, wherein a depth of a channel portion of the at least one of the first specified portion and the second specified portion of the first reactant gas channel is smaller than a depth of the specified second reactant gas channel.

4. The fuel cell separator according to claim 1, wherein a cross-sectional area of a channel portion of the first specified portion of the first reactant gas channel is smaller than a cross-sectional area of a channel portion of a portion of the first reactant gas channel which is other than the first specified portion.

5. The fuel cell separator according to claim 4, wherein a width of the channel portion of the first specified portion of the first reactant gas channel is smaller than a width of the channel portion of the portion of the first reactant gas channel which is other than the first specified portion.

6. The fuel cell separator according to claim 4, wherein a depth of the channel portion of the first specified portion of the first reactant gas channel is smaller than a depth of the channel portion of the portion of the first reactant gas channel which is other than the first specified portion.

7. The fuel cell separator according to claim 1, wherein a cross-sectional area of a channel portion of the second specified portion of the first reactant gas channel is smaller than a cross-sectional area of a portion of the first reactant gas channel which is other than the second specified portion.

8. The fuel cell separator according to claim 7, wherein a width of the channel portion of the second specified portion of the first reactant gas channel is smaller than a width of the portion of the first reactant gas channel which is other than the second specified portion.

9. The fuel cell separator according to claim 7, wherein a depth of the channel portion of the second specified portion of the first reactant gas channel is smaller than a depth of the portion of the first reactant gas channel which is other than the second specified portion.

10. The fuel cell separator according to claim 1, wherein the first reactant gas channel is connected to at least a second reactant gas channel of the one or more second reactant gas channels, which is located closest to the first reactant gas channel such that the first reactant gas channel is connected to at least the second reactant gas channel in a location downstream of the first specified portion.

11. The fuel cell separator according to claim 1, wherein the first reactant gas channel is connected to at least a second reactant gas channel of the one or more second reactant gas channels, which is located closest to the first reactant gas channel such that the first reactant gas channel is connected to at least the second reactant gas channel in a location upstream of the second specified portion.

12. The fuel cell separator according to claim 1, wherein a portion of the first reactant gas channel which lies between the first portion and the second portion has a spiral shape.

13. The fuel cell separator according to claim 1, wherein a portion of the first reactant gas channel which lies between the first portion and the second portion has a serpentine shape.

14. A fuel cell comprising:
a pair of fuel cell separators including the fuel cell separator as recited in claim 1; and
a membrane-electrode assembly including an electrolyte layer and a pair of electrodes sandwiching the electrolyte layer, the membrane-electrode assembly being sandwiched between the pair of fuel cell separators.

* * * * *